(12) United States Patent
Ciuperca

(10) Patent No.: US 10,640,425 B2
(45) Date of Patent: May 5, 2020

(54) METHOD FOR PREDETERMINED TEMPERATURE PROFILE CONTROLLED CONCRETE CURING CONTAINER AND APPARATUS FOR SAME

(71) Applicant: Romeo Ilarian Ciuperca, Norcross, GA (US)

(72) Inventor: Romeo Ilarian Ciuperca, Norcross, GA (US)

( * ) Notice: Subject to any disclaimer, the term of this patent is extended or adjusted under 35 U.S.C. 154(b) by 232 days.

(21) Appl. No.: 14/734,184

(22) Filed: Jun. 9, 2015

(65) Prior Publication Data

US 2015/0266783 A1 Sep. 24, 2015
US 2018/0111883 A9 Apr. 26, 2018

Related U.S. Application Data

(60) Provisional application No. 62/010,273, filed on Jun. 10, 2014.

(51) Int. Cl.
*C04B 40/00* (2006.01)
*C04B 40/02* (2006.01)
*B28B 11/24* (2006.01)

(52) U.S. Cl.
CPC ........ *C04B 40/0082* (2013.01); *B28B 11/246* (2013.01); *C04B 40/0075* (2013.01); *C04B 40/0286* (2013.01)

(58) Field of Classification Search
CPC .................. C04B 40/0075; C04B 40/0082
See application file for complete search history.

(56) References Cited

U.S. PATENT DOCUMENTS

| | | |
|---|---|---|
| 2,053,135 A | 9/1936 | Dalton |
| 3,199,828 A | 8/1965 | Newton |
| 3,596,351 A | 8/1971 | Tilton |
| 3,649,725 A | 3/1972 | Olson |
| 3,732,138 A | 5/1973 | Almog |
| 3,985,329 A | 10/1976 | Liegens |
| 4,052,031 A | 10/1977 | Melfi |
| 4,085,495 A | 4/1978 | Hebert |
| 4,090,336 A | 5/1978 | Carroll |
| 4,157,638 A | 6/1979 | Della-Donna |

(Continued)

FOREIGN PATENT DOCUMENTS

EP 2065530 A2 6/2009

OTHER PUBLICATIONS

Website capture dated Oct. 10, 2011 from Internet Archive Wayback Machine of https://web.archive.org/web/20111010212408/http://worldoftest.com/bendingdrain.htm retrieved Sep. 21, 2017, 3 pages.*

(Continued)

*Primary Examiner* — Nathan H Empie
(74) *Attorney, Agent, or Firm* — Robert E. Richards; Richards IP Law

(57) ABSTRACT

The invention comprises a method of curing concrete. The method comprises placing a concrete cylinder in an insulated container having a sufficient quantity of water therein so that the concrete cylinder is submerged in and surrounded by the water and selectively adding heat to the quantity of water in an insulated container, so that the temperature of the quantity of water follows a predetermined temperature profile. Apparatus for performing the method is also disclosed.

2 Claims, 7 Drawing Sheets

(56) References Cited

U.S. PATENT DOCUMENTS

| | | |
|---|---|---|
| 4,349,398 A | 9/1982 | Kearns et al. |
| 4,370,840 A | 2/1983 | Bisbee et al. |
| 4,516,372 A | 5/1985 | Grutsch |
| 4,646,498 A | 3/1987 | Schneller et al. |
| 4,669,234 A | 6/1987 | Wilnau |
| 4,744,849 A | 5/1988 | Michaud-Soret |
| 4,765,109 A | 8/1988 | Boeshart |
| 4,811,927 A | 3/1989 | Slonimsky et al. |
| 4,866,897 A | 9/1989 | Yount |
| 4,885,888 A | 10/1989 | Young |
| 4,889,310 A | 12/1989 | Boeshart |
| 4,907,386 A | 3/1990 | Ekroth |
| 4,947,600 A | 8/1990 | Porter |
| 5,107,648 A | 4/1992 | Roby |
| 5,171,118 A | 12/1992 | Rothenbuhler |
| 5,217,339 A | 6/1993 | O'Connor et al. |
| 5,323,578 A | 6/1994 | Chagnon et al. |
| D357,855 S | 5/1995 | Keith et al. |
| 5,493,837 A | 2/1996 | Hepler |
| 5,497,592 A | 5/1996 | Boeshart |
| 5,570,550 A | 11/1996 | Roby |
| 5,606,832 A | 3/1997 | Keith et al. |
| 5,611,182 A | 3/1997 | Spude |
| 5,761,874 A | 6/1998 | Hayakawa |
| 5,765,318 A | 6/1998 | Michelsen |
| 5,792,552 A | 8/1998 | Langkamp et al. |
| 5,809,723 A | 9/1998 | Keith et al. |
| 5,809,725 A | 9/1998 | Cretti |
| 5,809,726 A | 9/1998 | Spude |
| 5,809,728 A | 9/1998 | Tremelling |
| 5,849,489 A | 10/1998 | McKinney |
| 5,836,126 A | 11/1998 | Harkenrider et al. |
| 5,966,885 A | 10/1999 | Chatelain |
| 5,992,114 A | 11/1999 | Zelinsky et al. |
| 6,026,620 A | 2/2000 | Spude |
| 6,134,861 A | 10/2000 | Spude |
| 6,138,981 A | 10/2000 | Keith et al. |
| 6,207,937 B1 * | 3/2001 | Stoddard ................ C23C 16/52 219/483 |
| 6,234,736 B1 | 5/2001 | Miescher |
| 6,263,638 B1 | 7/2001 | Long, Sr. |
| 6,305,135 B1 | 10/2001 | Inaba |
| 6,314,694 B1 | 11/2001 | Cooper et al. |
| 6,360,505 B1 | 3/2002 | Johns |
| 6,426,029 B1 | 7/2002 | Hiscock et al. |
| 6,612,083 B1 | 9/2003 | Richards |
| 6,688,066 B1 | 2/2004 | Cottier et al. |
| 6,725,616 B1 | 4/2004 | Pease |
| 6,729,090 B2 | 5/2004 | Messenger et al. |
| 6,898,908 B2 | 5/2005 | Messenger et al. |
| 6,898,912 B2 | 5/2005 | Bravinski |
| 6,935,081 B2 | 8/2005 | Dunn et al. |
| 7,000,359 B2 | 2/2006 | Meyer |
| 7,398,131 B2 | 7/2008 | Trost et al. |
| 7,409,800 B2 | 8/2008 | Budge |
| 7,765,761 B2 | 8/2010 | Paradis |
| 7,818,935 B2 | 10/2010 | Velickovic |
| 7,934,693 B2 | 5/2011 | Bravinski |
| 8,032,244 B2 | 10/2011 | Trost et al. |
| 8,532,815 B1 * | 9/2013 | Ciuperca ................ B29C 39/00 324/637 |
| 8,555,583 B2 | 10/2013 | Ciuperca |
| 8,555,584 B2 | 10/2013 | Ciuperca |
| 8,636,941 B1 | 1/2014 | Ciuperca |
| 8,745,943 B2 | 6/2014 | Ciuperca |
| 8,756,890 B2 | 6/2014 | Ciuperca |
| 8,844,227 B1 | 9/2014 | Ciuperca |
| 8,855,803 B2 | 10/2014 | Ciuperca |
| 8,877,329 B2 | 11/2014 | Dunn et al. |
| 8,950,137 B2 | 2/2015 | Ciuperca |
| 8,951,460 B2 | 2/2015 | Ciuperca |
| 8,966,845 B1 | 3/2015 | Ciuperca |
| 9,003,740 B2 | 4/2015 | Ciuperca |
| 9,074,379 B2 | 7/2015 | Ciuperca |
| 9,114,549 B2 | 8/2015 | Ciuperca |
| 9,115,503 B2 | 8/2015 | Ciuperca |
| 9,145,695 B2 | 9/2015 | Ciuperca |
| 9,181,699 B2 | 11/2015 | Ciuperca |
| 2002/0005725 A1 | 1/2002 | Scott |
| 2002/0092253 A1 | 7/2002 | Beliveau |
| 2003/0170093 A1 | 9/2003 | Janeway |
| 2003/0192272 A1 | 10/2003 | Bravinski |
| 2004/0129857 A1 | 7/2004 | Musk et al. |
| 2005/0108985 A1 | 5/2005 | Bravinski |
| 2006/0179787 A1 | 8/2006 | Bilowol |
| 2007/0062143 A1 | 3/2007 | Noushad |
| 2007/0095255 A1 | 5/2007 | Abbate et al. |
| 2007/0144653 A1 | 6/2007 | Padilla et al. |
| 2008/0041004 A1 | 2/2008 | Gibbar et al. |
| 2008/0313991 A1 | 6/2008 | Chouinard |
| 2008/0173788 A1 | 7/2008 | Brewka et al. |
| 2009/0173870 A1 | 7/2009 | Long, Sr. |
| 2009/0202307 A1 | 8/2009 | Au et al. |
| 2009/0218474 A1 | 9/2009 | Bowman |
| 2009/0277103 A1 | 11/2009 | De Jaham |
| 2010/0062667 A1 | 3/2010 | Pan et al. |
| 2010/0162659 A1 | 7/2010 | Laprise |
| 2010/0192498 A1 | 8/2010 | Gleckman |
| 2010/0232877 A1 | 9/2010 | Sanvik et al. |
| 2010/0319295 A1 | 12/2010 | Nelson |
| 2011/0057090 A1 | 3/2011 | Spude et al. |
| 2011/0094295 A1 * | 4/2011 | Meadows ................ G01N 3/08 73/38 |
| 2012/0058299 A1 | 3/2012 | Serwin |
| 2013/0343734 A1 | 12/2013 | Dock, II et al. |
| 2014/0272302 A1 | 9/2014 | Ciuperca |
| 2014/0333004 A1 | 11/2014 | Ciuperca |
| 2014/0333010 A1 | 11/2014 | Ciuperca |
| 2015/0069647 A1 | 3/2015 | Ciuperca |
| 2015/0069664 A1 | 3/2015 | Ciuperca |
| 2015/0266783 A1 | 9/2015 | Ciuperca |

OTHER PUBLICATIONS

Portland Cement Association; Concrete Technology Today, vol. 18/No. 2, Jul. 1997, p. 1-4. (Year: 1997).*

IntelliCure Match brochure (2012).

* cited by examiner

METHOD FOR PREDETERMINED TEMPERATURE PROFILE CONTROLLED CONCRETE CURING CONTAINER AND APPARATUS FOR SAME

CROSS REFERENCE TO RELATED APPLICATIONS

The present application claims the benefit of the filing date of provisional application Ser. No. 60/010,273 filed Jun. 10, 2014.

FIELD OF THE INVENTION

The present invention generally relates to concrete curing. More particularly, this invention relates to a system for controlling the temperature of concrete cylinders in a concrete curing box or cabinet. The present invention also relates to curing concrete over time in a concrete curing box or cabinet according to a predetermined temperature profile. The present invention also relates to a system for controlling the temperature in a concrete curing box or cabinet according to a predetermined temperature profile.

BACKGROUND OF THE INVENTION

Concrete walls, and other concrete structures and objects, traditionally are made by building a form or a mold. The forms and molds are usually made from wood, plywood, metal and other structural members. Unhardened (plastic) concrete is poured into the space defined by opposed spaced form members. Once the concrete hardens sufficiently, although not completely, the forms are removed leaving a concrete wall, or other concrete structure, structural member or concrete object, exposed to ambient temperatures. The unprotected concrete walls, structures or objects are then exposed to the elements during the remainder of the curing process. The exposure of the concrete to the elements, especially temperature variations, often makes the curing of the concrete a slow process and the ultimate strength difficult to control or predict. To compensate fir these losses, larger amounts of portland cement sometimes are used than otherwise would be necessary in order to insure sufficient concrete strength is achieved.

The curing of plastic concrete requires two elements, water and heat, to fully hydrate the cementitious material. The curing of plastic concrete is an exothermic process. This heat is produced by the hydration of the portland cement, or other cementitious materials, that make up the concrete. Initially, the hydration process produces a relatively large amount of heat. As the hydration process proceeds, the rate of hydration slows thereby reducing the rate of heat production. At the same time, moisture in the concrete is lost to the environment. If one monitors the temperature of concrete during the curing process, it produces a relatively large increase in temperature which then decreases rapidly over time. This chemical reaction is temperature dependent. That is, the hydration process, and consequently the strength gain, proceeds faster at higher temperature and slower at lower temperature. In traditional curing of concrete, first, the heat is lost which slows the hydration process; then, the moisture is lost making it difficult for the cementitious material to fully hydrate, and, therefore, impossible for the concrete to achieve its maxim strength.

Concrete in conventional concrete forms or molds is typically exposed to the elements. Conventional forms or molds provide little insulation to the concrete contained therein. Therefore, heat produced within the concrete form or mold due to the hydration process usually is lost through a conventional concrete form or mold relatively quickly. Thus, the temperature of the plastic concrete may initially rise 20 to 40° C., or more, above ambient temperature due to the initial hydration process and then fall relatively quickly to ambient temperature, such as within 12 to 36 hours. This initial relatively large temperature drop may result is concrete shrinkage and/or concrete cracking. The remainder of the curing process then proceeds at approximately ambient temperatures, because the relatively small amount of additional heat produced by the remaining hydration process is relatively quickly lost through the uninsulated concrete form or mold. The concrete is therefore subjected to the hourly or daily fluctuations of ambient temperature from hour-to-hour, from day-to-night and from day-to-day. Failure to cure the concrete under ideal temperature and moisture conditions affects the ultimate strength and durability of the concrete. In colder weather, concrete work may even come to a halt since concrete will freeze, or not gain much strength at all, at relatively low temperatures. By definition (ACI 306), cold weather conditions exist when " . . . for more than 3 consecutive days, the average daily temperature is less than 40 degrees Fahrenheit and the air temperature is not greater than 50 degrees Fahrenheit for more than one-half of any 24 hour period." Therefore, in order fbr hydration to take place, the temperature of concrete must be above 40° F.; below 40° F., the hydration process slows and at some point may stop altogether. It is typically recommended that concrete be moisture cured for 28 days to fully hydrate the concrete. However, this is seldom possible to achieve in commercial practice.

It is typical that concrete cylinders are poured from the same concrete mix used to form a watt, slab or other structure. These cylinders are then cured under water at 72 F. according to ASTM C-39. This method provides a standard by which the compressive strength of concrete can be determined. However, it bears little relationship to the concrete that is cured under ambient conditions.

Engius, Inc. has developed the IntelliCure Match concrete curing box. This concrete curing box comprises an insulated container with both heating and cooling elements disposed below the water level in the curing box. A temperature sensor disposed below the water level sends signals to a microprocessor. The microprocessor controls the amount of heating or cooling provided to the water in the curing box. A temperature sensor, such as the Intellirock sensor, is embedded in a curing concrete wall, slab or other concrete structure of interest that is subjected to the environment. The Intellirock sensor senses the actual temperature of the curing concrete. A signal is provided by the Intellirock sensor to the microprocessor. The microprocessor is programmed so that it controls the heating or cooling of the water in the curing box so that the temperature of the water matches the temperature of the curing concrete watt, slab or other concrete structure in which the Intellirock sensor is embedded. The IntelliCure Match concrete curing box therefore duplicates the temperature conditions actually experienced by the curing concrete wall, slab or other concrete structure of interest. The IntelliCure Match concrete curing box can also maintain the temperature of the water in the curing box at any desired constant temperature level.

Although the IntelliCure Match concrete curing box provides a useful function, it cannot control the temperature within the concrete curing box according to a predetermined temperature profile as a function of time. Curing concrete according to a predetermined temperature profile as a function of time provides desirable advantages, as disclosed in U.S. Pat. No. 8,545,749 (the disclosure of which is incorporated herein by reference in its entirety).

Therefore, it would be desirable to provide a concrete curing box that can cure concrete cylinders according to a predetermined temperature profile as a function of time. It would also be desirable to provide a concrete curing system that adjusts the temperature of curing concrete cylinders so that the temperature follows a predetermined temperature profile as a function of time.

SUMMARY OF THE INVENTION

The present invention satisfies the foregoing needs by providing an improved system for curing concrete under predetermined controlled temperature conditions over time.

In one disclosed embodiment, the present invention comprises a method. The method comprises placing a quantity of plastic concrete in an insulated container having a sufficient quantity of water therein so that the plastic concrete is submerged in and surrounded by the water and selectively adding heat to the water in the insulated container, so that the temperature of the water follows a predetermined temperature profile as a function of time during at least a portion of the concrete curing process.

In another disclosed embodiment, the present invention comprises a method. The method comprises placing a concrete cylinder in an insulated container having a sufficient quantity of water therein so that the concrete cylinder is submerged in and surrounded by the water and controlling the temperature of the water so that the water temperature follows a predetermined concrete curing temperature profile as a function of time.

In another disclosed embodiment, the present invention comprises a method. The method comprises placing a concrete cylinder in a quantity of water, detecting the temperature of the quantity of water, selectively adding heat to the water in response to the detected temperature and controlling the temperature of the water so that the water temperature follows a predetermined concrete curing temperature profile as a function of time during at least a portion of the concrete curing process.

In another disclosed embodiment, the present invention comprises an apparatus. The apparatus comprises an insulated container sized and shaped for containing a quantity of water and at least one concrete cylinder submerged in and surrounded by the quantity of water, a heating element in communication with the quantity of water and a temperature sensory in thermal communication with the quantity of water so that the temperature sensor detects the temperature of the quantity of water. The apparatus also comprises a computing device controlling the heating element so that heat is selectively added to the quantity of water and the computing device is programmed so that it controls the heating element such that the temperature of the quantity of water follows a predetermined concrete curing temperature profile as a function of time.

In another disclosed embodiment, the present invention comprises a method. The method comprises selectively adding heat to water in a container in which a curing concrete cylinder is submerged in and surrounded by the water such that the temperature of the curing concrete follows a predetermined temperature profile as a function of time during at least a portion of the concrete curing process.

In another embodiment, the present invention comprises a method. The method comprises placing plastic concrete in a thermally insulated container and detecting the temperature of the concrete. The method also comprises selectively adding heat to the concrete in response to the detected temperature of the concrete so as to control the temperature of the curing concrete according to a predetermined temperature profile as a function of time.

In another embodiment, the present invention comprises a method. The method comprises detecting the temperature of a quantity of curing concrete in a thermally insulated container and selectively adding heat to the curing concrete in response to the detected temperature thereof so that the temperature of the curing concrete follows a predetermined temperature profile as a function of time.

In another embodiment, the present invention comprises an apparatus. The apparatus comprises a temperature sensor for detecting the temperature of concrete within a container and an electric heating element for providing heat to concrete within container. The apparatus also comprises a controller connected to the electric heating element for adjusting the amount of heat produced by the heating element and a computing device connected to the temperature sensor so that the computing device can detect the temperature of the concrete within the container, the computing device being connected to the controller and programmed to control the amount of heat provided by the electric heating element so that the temperature of concrete in the container is controlled to follow a predetermined temperature profile as a function of time.

In another embodiment, the present invention comprises a method. The method comprises selectively adding heat to curing concrete in an insulated container such that the temperature of the curing concrete follows a predetermined temperature profile as a function of time during at least a portion of the concrete curing process.

In another embodiment, the present invention comprises a method. The method comprises selectively adding heat to and selectively removing heat from curing concrete such that the temperature of the curing concrete follows a predetermined temperature profile as a function of time during at least a portion of the concrete curing process.

Accordingly, it is an object of the present invention to provide an improved concrete curing system.

Another object of the present invention is to provide an improved method for curing concrete.

A further object of the present invention is to provide a system for curing concrete that controls the temperature of the concrete during the curing process according to a predetermined concrete curing temperature profile as a function of time.

Another object of the present invention is to provide a method for accelerating the maturity or equivalent age of concrete to achieve improved concrete strength.

Another object of the present invention is to provide a system for curing concrete such that the concrete develops its maximum strength as early as possible.

Yet another object of the present invention is to provide a system for curing concrete such that the concrete develops its maximum durability.

Another object of the present invention is to provide a system for curing concrete more quickly.

A further object of the present invention is to provide a system for curing concrete that controls the temperature of the concrete in a thermally insulated container according to a predetermined temperature profile as a function of time.

Another object of the present invention is to provide a system for curing concrete in an insulated container that lowers the maximum concrete temperature gradually over time at a predetermined rate to a predetermined temperature, thereby reducing or eliminating temperature shrinkage and/or cracking.

Another object of the present invention is to provide an improved standard for curing concrete.

A further object of the present invention is to provide a concrete curing container that can be selectively heated in a controlled manner to follow a predetermined concrete curing temperature profile as a function of time.

Another object of the present invention is to provide an electrically heated concrete curing container that can be selectively cooled in a controlled manner to follow a predetermined concrete curing temperature profile as a function of time.

These and other objects, features and advantages of the present invention will become apparent after a review of the following detailed description of the disclosed embodiments and the appended drawing and claims.

DETAILED DESCRIPTION OF THE DISCLOSED EMBODIMENTS

The disclosures of U.S. Pat. Nos. 8,532,815; 8,636,941 and 8,545,749 are all incorporated herein by reference in their entirety.

Figure 1:
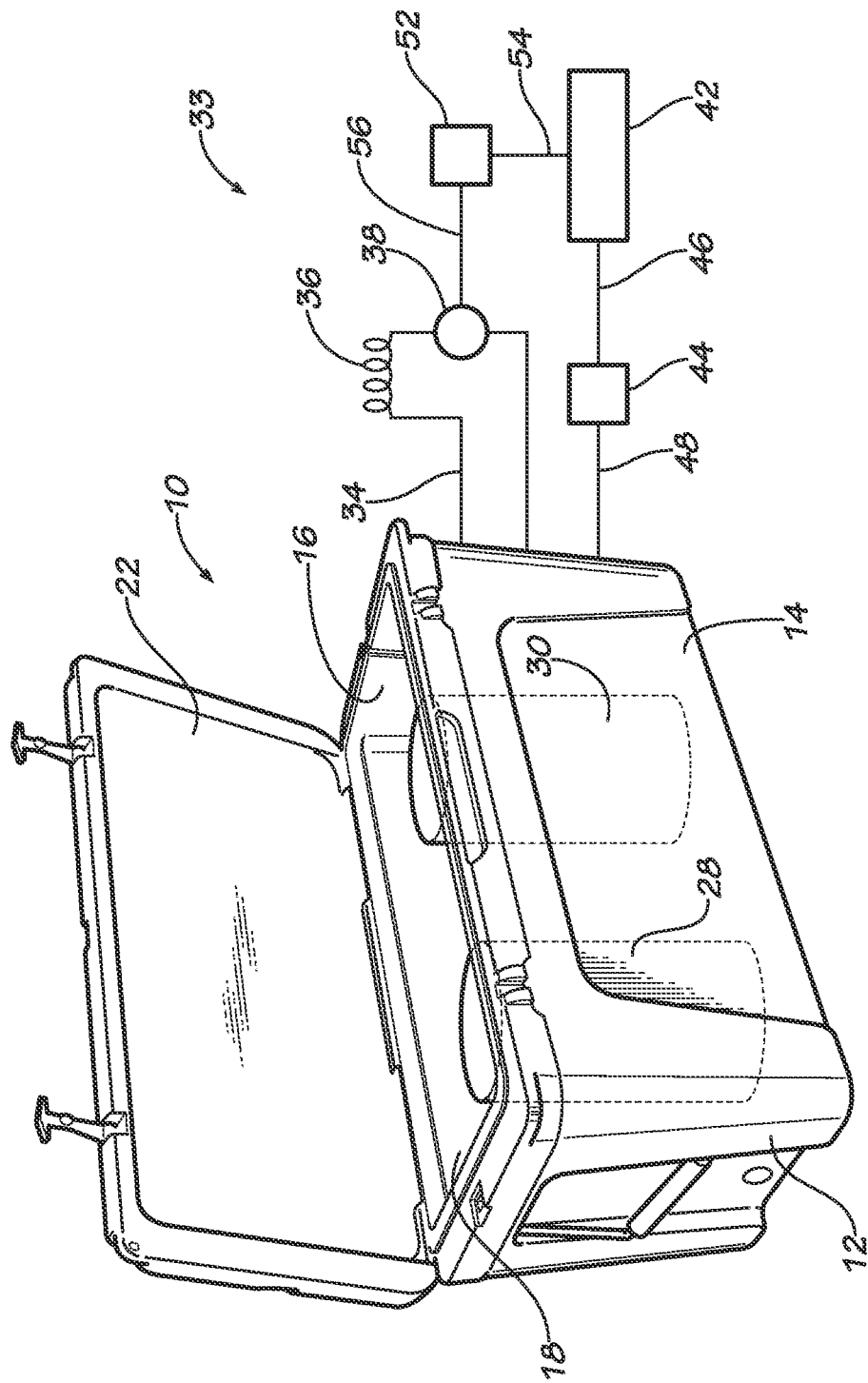
FIG. 1 is the perspective view of a disclosed embodiment of an insulated concrete container and a schematic diagram of a disclosed embodiment of a predetermined temperature control system in accordance with the present invention.

Referring now to the drawing in which like numbers indicate like elements throughout the several views, there is shown in FIG. 1 a disclosed embodiment of an insulated container 10 in accordance with the present invention. The insulated container 10 is preferably an ice chest, such as the Yeti Tundra® cooler available from Yeti Coolers, Austin, Tex. An example of a Yeti cooler is also disclosed in U.S. Patent Application Publication No. 2012/0132657 (the disclosure of which is incorporated herein by reference in its entirety). The insulated container 10 has four sides 12, 14, 16, 18, a bottom 20 and a hinged top 22 that opens and closes. The construction of such coolers is well known in the art and the particular design of the insulated container 10 is not a critical feature of the present invention.

The insulated container 10 is provided with a water heating system. Disposed in the bottom of the insulated container 10 is an electric resistance heating element 24. The electric resistance heating element 24 produces heat when an electric current is passed there through. The electric resistance heating element 24 is formed in the shape of a loop within the insulated container 10.

Disposed above and covering the electric resistance heating element 24 is a foraminous plate 26. The foraminous plate 26 provides support for concrete cylinders, such as the concrete cylinders 28, 30, placed in the insulated container 10. The insulated container 10 contains a sufficient amount of water 32 so that the concrete cylinders 28, 30 are completely submerged in and surrounded by the water when the concrete cylinders are placed on the foraminous plate 26. The electric resistance heating element 24 is also submerged in the water 32 whereby the electric resistance heating element is in thermal communication with the water so that when an electric current is passed through the electric resistance heating element it heats the electric resistance heating element which in turn heats the water. By heating the water 32 in which the concrete cylinders 28, 30 are submerged and surrounded, the concrete cylinders can be heated, also; i.e., the concrete cylinders will assume the same temperature as the water in which they are immersed.

The insulated container 10 is optionally provided with a water cooling system 33. Optionally, disposed in the bottom of the insulated container 10 below the foraminous plate 26 is a cooling coil 34. The cooling coil 34 is connected at one end to a radiator coil 36, which is then connected to a compressor 38, which in turn is connected to the other end of the cooling coil. The cooling coil 34, radiator coil 36 and compressor 38 form a closed system, which is partially filled with a refrigerant fluid; i.e., a low boiling fluid, such as R-22, R-401A or R-401C. The compressor 38 compresses the refrigerant gas and changes it to a fluid. The hot refrigerant fluid flows from the compressor 38 to the radiator coil 36 where heat from the hot refrigerant fluid is radiated to the surroundings. The refrigerant fluid flows from the radiator coil 36 to an expansion valve (not shown) in the cooling coil 34. At the expansion valve, the refrigerant changes from a fluid to a gas. The refrigerant gas flows through the cooling coil 34. The cold refrigerant gas in the cooling coil 34 absorbs heat from the water 32 surrounding it. The refrigerant gas flow from the cooling coil 34 to the compressor 38, where the process is repeated. By operating the compressor 38, heat can be removed from the water 32 in the insulated container 10. By removing heat from the water 32 in which the concrete cylinders 28, 30 are submerged and surrounded, heat can be removed from the concrete cylinders, also. Thus, the water 32 in which the concrete cylinders 28, 30 are submerged and surrounded can be selectively heated or cooled by either passing an electric current through the electric resistance heating element 34 or by operating the compressor 38.

A temperature sensor 40 is disposed in the insulated container 10 and in thermal communication with the water 32 in the insulated container; i.e., the temperature sensor is submerged in the water. The temperature sensor 40 is connected to a computing device 42 by an electric circuit, such as by the wires 44. The computing device 42 is preferably a computer, a microprocessor or central processing unit (CPU) with EERAM function to store parameters or a specially programmed digital controller. The temperature sensor 40 measures the temperature of the water 32 in the insulated container 10.

The computing device 42 is connected to the temperature sensor 40 so that it can continuously, or periodically, read and store the temperature measured by the temperature sensors. The computing device 42 is connected to an electric resistance heating element controller 44 by an electric circuit, such as the wires 46. The electric resistance heating element controller 44 is connected to a source of electricity, such as 24, 60, 120 or 220 volts AC or 12 or 24 volts DC electric current, by wires (not shown). The lower voltages are preferred as they reduce or eliminate the chances of electrocution by a worker. The electric resistance heating element controller 44 is connected to the electric resistance heating element 24 by an electric circuit, such as by the wires 48, 50. The computing device 42 and the electric resistance heating element controller 44 are configured and programmed such that the computing device controls the amount of heat produced by the electric resistance heating element. Thus, the computing device 42 controls the amount of heat that is provided to the water 32 within the insulated container 10.

The computing device 42 is optionally connected to a compressor controller 52 by an electric circuit, such as the wires 54. The compressor controller 52 is connected to a source of electricity, such as 120 or 220 volts AC or 12 or 24 volts DC electric current, by wires (not shown). The lower voltages are preferred as they reduce or eliminate the chances of electrocution by a worker. The compressor controller 52 is connected to the compressor 38 by an electric circuit, such as by the wires 56. The computing device 42 and the compressor controller 52 are configured and programmed such that the computing device controls the amount of heat removed by the cooling coil 34. Thus, the computing device 42 controls the amount of heat that is removed from the water 32 within the insulated container 10.

Since the computing device 42 continuously or periodically measures the temperature of the water 32, and since the computing device controls the amount of heat added to the water 32 by the electric resistance heating element 24 and the amount of heat removed from the water by the cooling coil 34, the computing device can control the temperature of the water. Since the concrete cylinders 28, 30 are submerged in and surrounded by the water 32 in the insulated container 10, the computing device 42 therefore controls the temperature of the concrete cylinders. The foregoing is commercially available as the IntelliCure Match concrete curing box from Engius, Inc., Sillwater, Okla. 74074 USA. It is also disclosed in U.S. Patent Application Publication No. 2013/0343734 (the disclosure of which is incorporated herein by reference in its entirety). Similar computer temperature controlled concrete curing boxes are available from other manufacturers.

An input device 58 is connected to the computing device 42 by an electric circuit, such as by the wires 59. The input device 58 allows a user to provide input to the computing device 42, such as programming, operating parameters and/or data input. In a disclosed embodiment of the present invention, the computing device is pre-programmed so as to control the temperature of the water 32, and therefore the temperature of the concrete cylinders 28, 30, according to a predetermined concrete curing temperature profile. In a disclosed embodiment of the present invention, the input device 58 can be a keyboard, a keypad, a touch screen, a hard disk drive, a flash drive, a memory stick, a disk drive, a compact disk, a DVD or a combination thereof.

Figure 4:
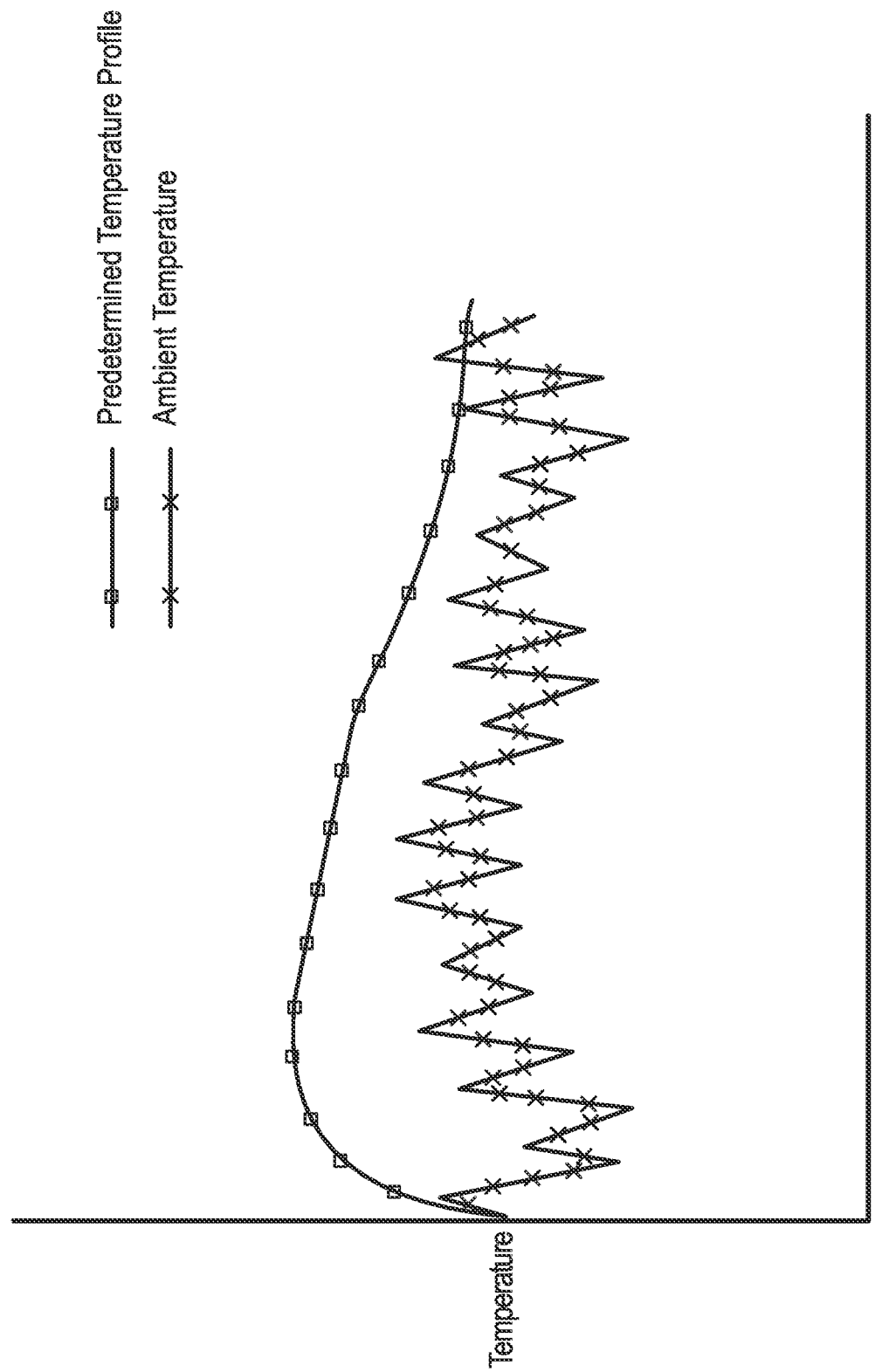
FIG. 4 is a graph of concrete temperature versus elapsed concrete curing time of a disclosed embodiment of a predetermined temperature profile as a function of time for curing concrete in accordance with the present invention. An example of ambient temperature is also shown on the graph.
Figure 5:
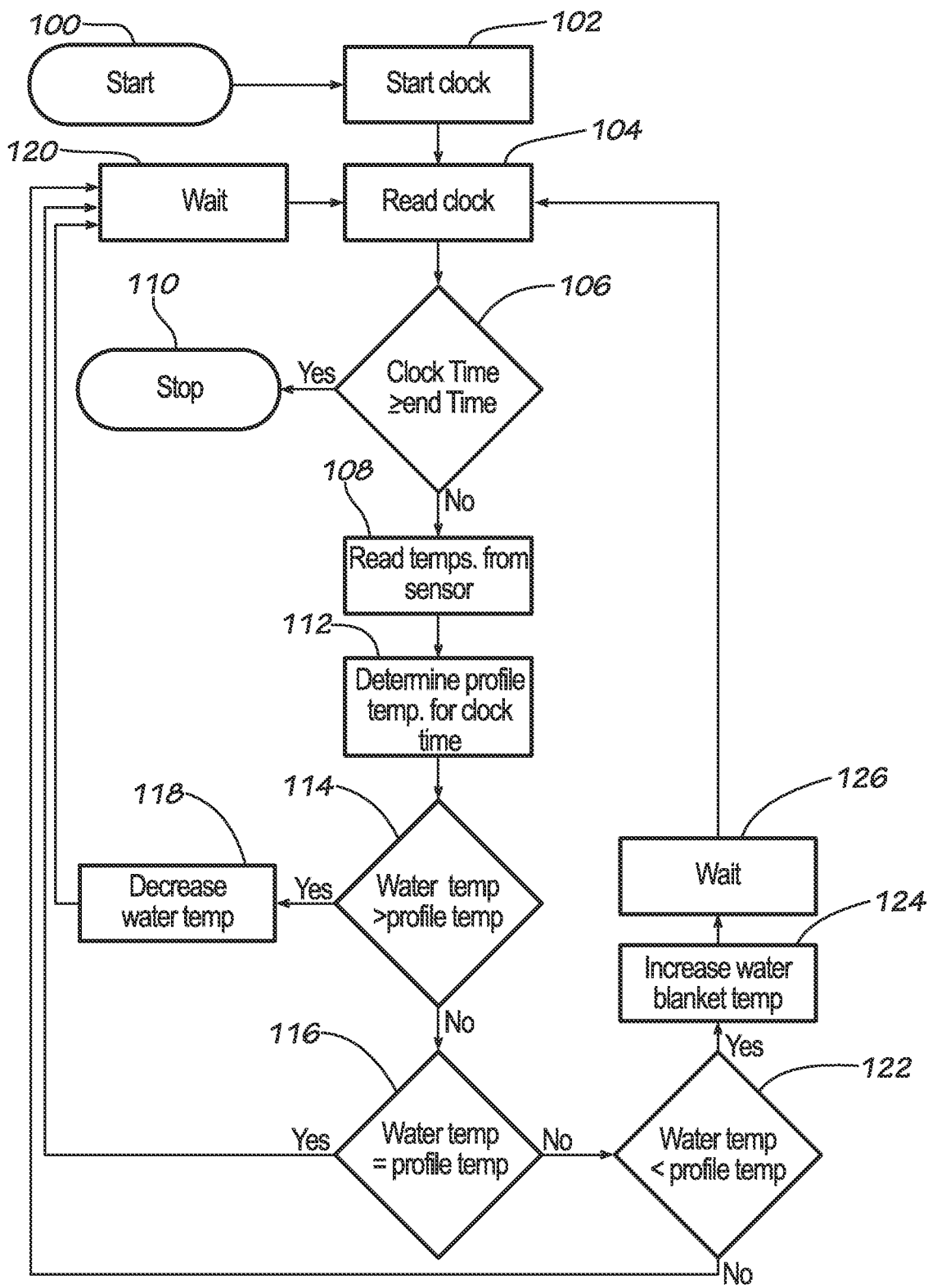
FIG. 5 is a flow diagram for controlling the insulated concrete container shown in FIGS. 1 and 2 for following a predetermined temperature profile for curing concrete.
Figure 6:
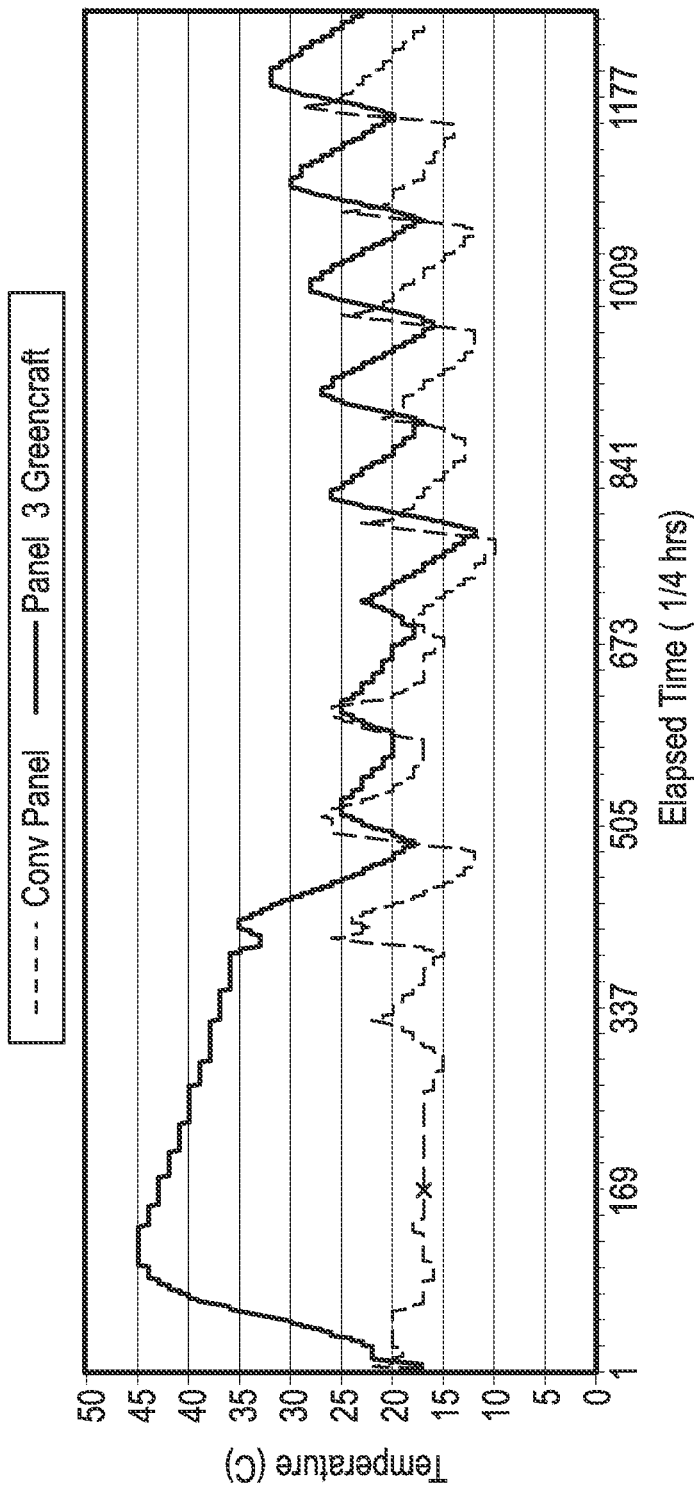
FIG. 6 is a graph of concrete temperature versus elapsed concrete curing time of another disclosed embodiment of predetermined temperature profiles as a function of time for curing concrete in accordance with the present invention.

FIGS. 4-6 shows graphs of various disclosed embodiments of concrete curing temperature profiles as a function of time. In these graphs, the temperature of the concrete is shown on the vertical axis and elapsed concrete curing time is shown on the horizontal axis. FIG. 4 shows a predetermined temperature profile as a function of time. FIG. 4 also shows ambient temperature as a function of time. Both of these graphs are examples of predetermined temperature profiles as a function of time that can be used with the present invention. In this graph, the temperature of the concrete is shown on the vertical axis and elapsed concrete curing time is shown on the horizontal axis. The intersection of the vertical and horizontal axes represents 0° C. concrete temperature and zero elapsed concrete curing time. Ambient temperature is also shown on this graph. The peaks and troughs of the ambient temperature represent the daily (i.e., day to night) fluctuation of ambient temperature. As can be seen in this graph, the temperature of the concrete initially increases quite rapidly over a relatively short time, such as 1 to 3 days. After a period of time, the concrete temperature reaches a maximum and then slowly drops to ambient temperature over an extended period, such as 1 to 7 days, preferably 1 to 14 days, more preferably 1 to 28 days, especially 3 to 5 days or more especially 5 to 7 days.

FIG. 6 shows a concrete curing temperature profile as a function of time for concrete cured in an insulated concrete form (Panel 3 Greencraft) and a concrete curing temperature profile as a function of time for concrete cured in a conventional concrete form. Both of these graphs are examples of predetermined temperature profiles as a function of time that can be used with the present invention.

Figure 7:
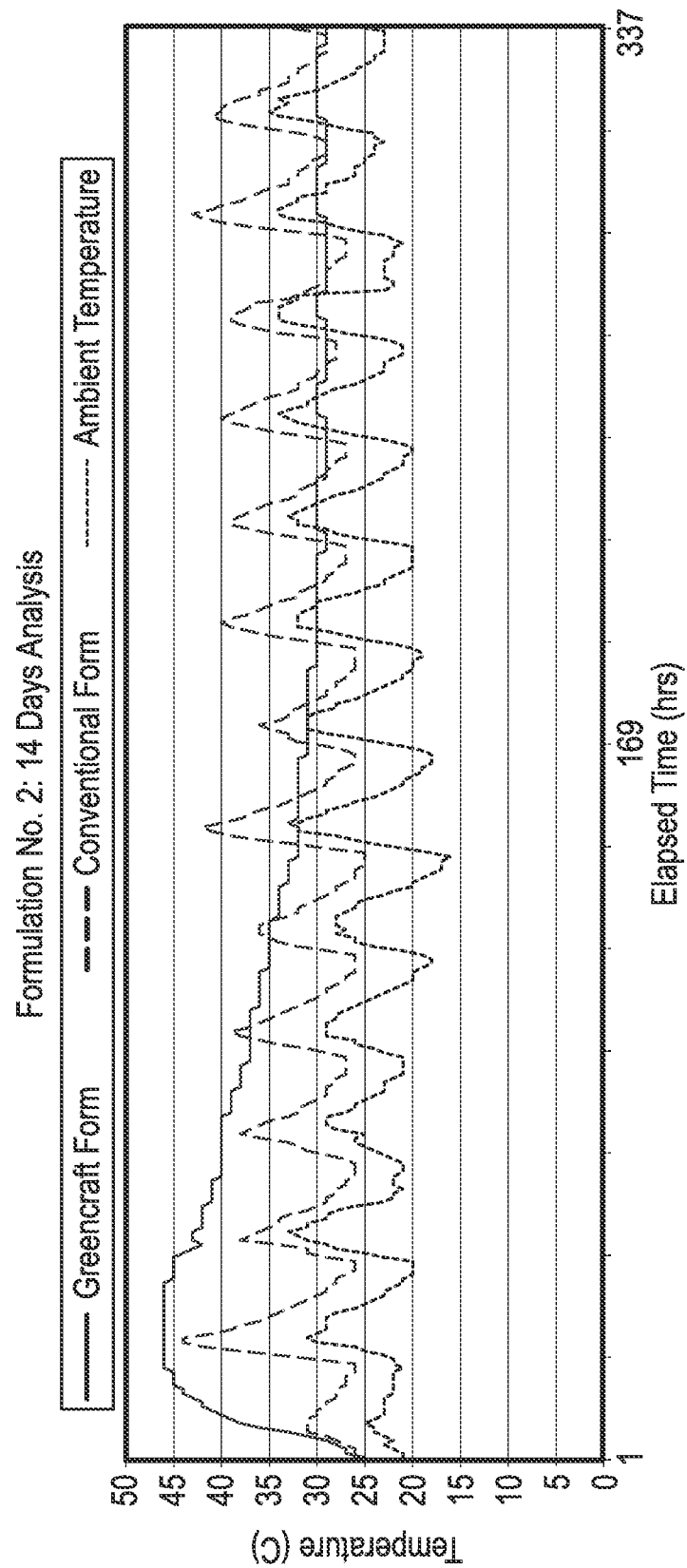
FIG. 7 is a graph of concrete temperature versus elapsed concrete curing time of another disclosed embodiment of predetermined temperature profiles as a function of time for curing concrete in accordance with the present invention.

FIG. 7 shows a concrete curing temperature profile as a function of time for concrete cured in an insulated concrete form (Greencraft form) and a concrete curing temperature profile as a function of time for concrete cured in a conventional concrete form. FIG. 7 also shows ambient temperature as a function of time. All three of these graphs are examples of predetermined temperature profiles as a function of time that can be used with the present invention.

As used herein the term "temperature profile" includes increasing the concrete temperature above ambient temperature over a period of time preferably in a non-linear manner followed by decreasing the concrete temperature over a period of time.

The term "temperature profile" also includes increasing the temperature and decreasing the temperature of the concrete at least twice or multiple times, such as shown for the ambient temperature shown in FIG. 4 and the temperatures shown in FIGS. 6 and 7. The term "temperature profile" also includes increasing the temperature and decreasing the temperature at predetermined rates. The term "temperature profile" specifically does not include adding a constant amount of heat to the concrete followed by stopping adding heat to the concrete, such as would be involved when turning an electrically heated blanket, steam or heated concrete form on and then turning the heated blanket, steam or heated concrete form off. The term "temperature profile" specifically does not include heating the concrete to a desired temperature and then turning off the heat. The term "temperature profile" specifically does not include maintaining a constant preset temperature.

FIG. 5 shows a flow diagram for a disclosed embodiment of a process for controlling the heat provided to curing concrete cylinders so that the temperature of the concrete can be controlled to match a desired temperature profile, such as that shown in FIGS. 4-6. The computing device 42 is programmed so that it will perform the process shown by this flow diagram.

Figure 2:
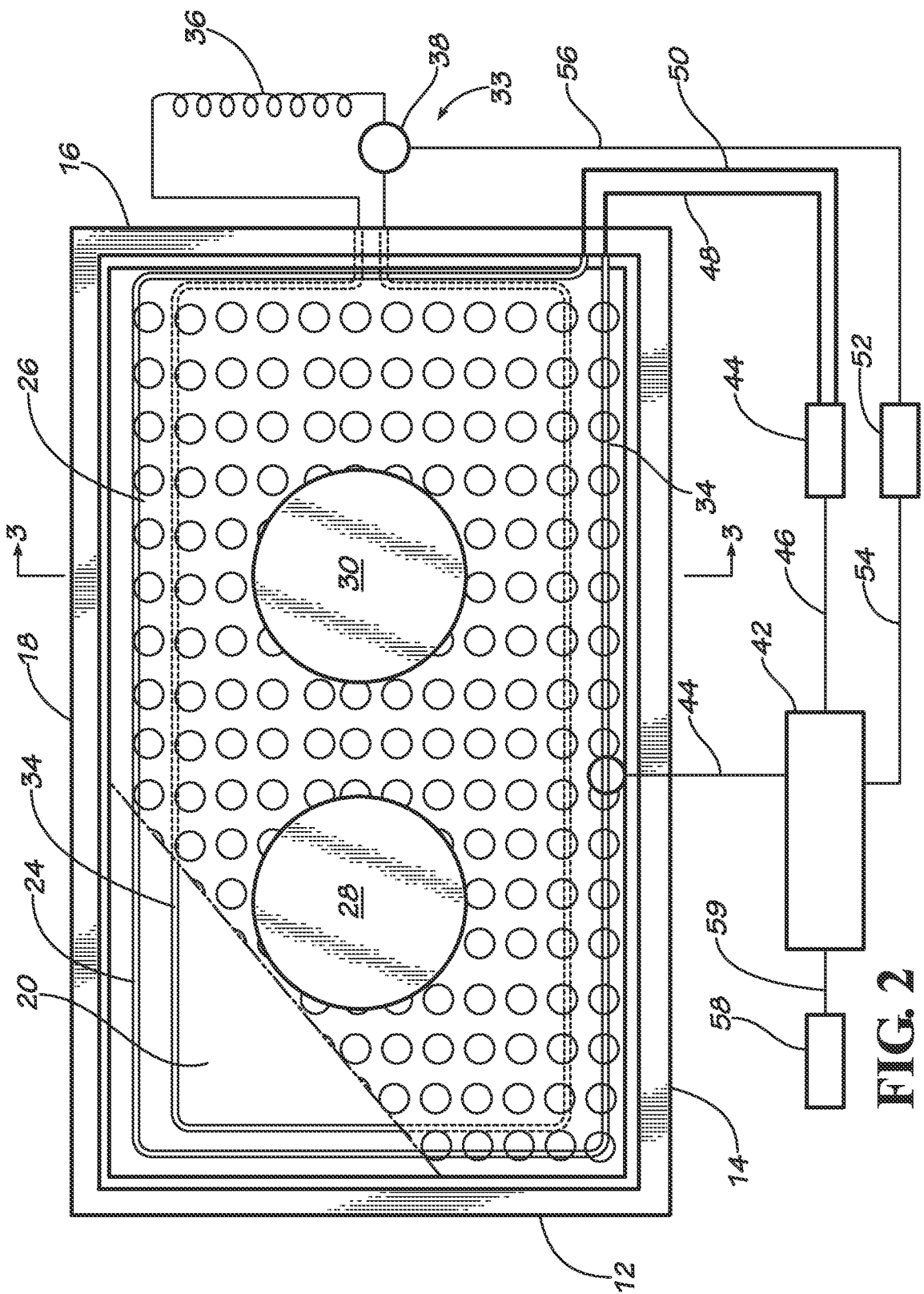
FIG. 2 is the top plan view of a disclosed embodiment of the insulated concrete container shown in FIG. 1 and a schematic diagram of a disclosed embodiment of a temperature control system in accordance with the present invention.
Figure 3:
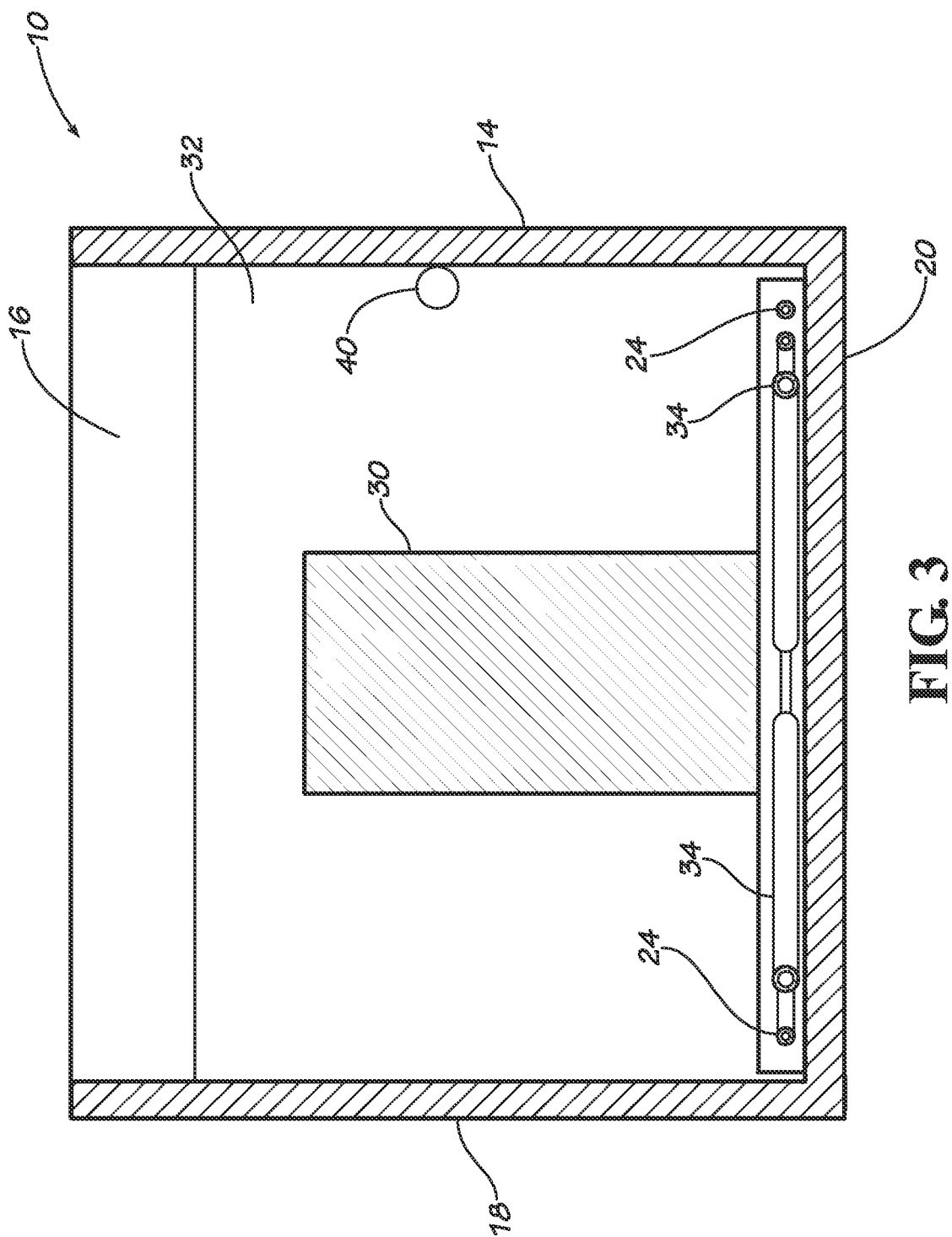
FIG. 3 is cross-sectional view taken along the line 3-3 of the insulted container shown in FIG. 2.

The process starts at the block 100 and proceeds to the block 102 where a clock is initialized to time equal to zero and the clock is started. The clock measures the elapsed time from when the plastic concrete cylinder is placed into a concrete curing container, such as the insulated container 10 shown in FIGS. 1-3. This elapsed time therefore is a measure of the elapsed time for the curing of the concrete.

The process proceeds from the block 102 to the block 104 where the clock is read. The time that is read from the clock is then stored in a memory location, such as in the RAM memory of the computing device 42. The process proceeds from the block 104 to the decision block 106. A desired end time for terminating the process, such as 1 to 28 days, is preprogrammed into a memory location in the computing device 42. At the block 106, the clock time stored in the memory location is compared to the end time stored in the memory location of the computing device 42. If the clock time is less than the end time, the process proceeds to the block 108. If the clock time is greater than or equal to the end time, the process proceeds to the block 110 where the process is terminated.

At the block 108, the temperature from the water temperature sensor 40 is read and stored in a memory location, such as in the RAM memory of the computing device 42. The process then proceeds from the block 108 to the block 112.

At the block 112 the temperature value for the clock time stored in the memory location is determined from the predetermined temperature profile. This can be done from the temperature profile curve, such as the curve shown in FIGS. 4, 6 and 7. The clock time is found on the horizontal axis and the temperature is determined by finding the vertical axis component of the curve for the time corresponding to the clock time. When this temperature is determined, it is stored in a memory location, such as in the RAM memory of the computing device 42. In an alternate disclosed embodiment, instead of using a graph, such as shown in FIGS. 4-6, the temperature profile can be in the form of a lookup table. The lookup table lists a range of times and a profile temperature corresponding to each of the ranges of time. For example, for the time 20 hours to 21 hours, the corresponding profile temperature from the lookup table might be 45° C.; for the time 21 hours to 22 hours, the corresponding profile temperature from the lookup table might be 46° C. Of course, the time intervals for the lookup table can be longer or shorter than one hour and any useful or desirable time interval can be used for the lookup table, such as every minute, every 5 minutes or every fifteen minutes. Examples of lookup tables useful in the present invention are shown in Tables I to VI below. Tables I-III are examples of predetermined temperature profiles that includes a single peak temperature followed by a gradual cooling. Tables IV-VI are examples of predetermined temperature profiles that includes multiple heating and cooling cycles.

TABLE I

| Time (hrs) | Temp. (° C.) |
|---|---|
| 0 | 26 |
| 1 | 26 |
| 2 | 26 |
| 3 | 27 |
| 4 | 28 |
| 5 | 29 |
| 6 | 31 |
| 7 | 31 |
| 8 | 31 |
| 9 | 31 |
| 10 | 30 |
| 11 | 30 |
| 12 | 29 |
| 13 | 29 |
| 14 | 28 |
| 15 | 28 |
| 16 | 28 |
| 17 | 27 |
| 18 | 27 |
| 19 | 27 |
| 20 | 26 |
| 21 | 26 |
| 22 | 26 |
| 23 | 30 |
| 24 | 34 |
| 25 | 38 |
| 26 | 42 |
| 27 | 44 |
| 28 | 44 |
| 29 | 41 |
| 30 | 39 |
| 31 | 38 |
| 32 | 36 |
| 33 | 35 |
| 34 | 34 |
| 35 | 33 |
| 36 | 32 |
| 37 | 31 |
| 38 | 30 |
| 39 | 29 |
| 40 | 29 |
| 41 | 28 |
| 42 | 28 |
| 43 | 27 |
| 44 | 26 |
| 45 | 26 |
| 46 | 26 |

TABLE II

| Time (hrs) | Temp. (° C.) |
|---|---|
| 0 | 25 |
| 1 | 27 |
| 2 | 27 |
| 3 | 28 |
| 4 | 29 |
| 5 | 31 |
| 6 | 33 |
| 7 | 36 |
| 8 | 38 |
| 9 | 39 |
| 10 | 40 |
| 11 | 41 |
| 12 | 42 |
| 13 | 42 |
| 14 | 43 |
| 15 | 44 |
| 16 | 44 |
| 17 | 45 |
| 18 | 45 |
| 19 | 45 |
| 20 | 45 |
| 21 | 46 |
| 22 | 46 |
| 23 | 46 |
| 24 | 46 |
| 25 | 46 |
| 26 | 46 |

TABLE II-continued

| Time (hrs) | Temp. (° C.) |
|---|---|
| 27 | 46 |
| 28 | 46 |
| 29 | 46 |
| 30 | 46 |
| 31 | 46 |
| 32 | 46 |
| 33 | 46 |
| 34 | 46 |
| 35 | 46 |
| 36 | 46 |
| 37 | 46 |
| 38 | 46 |
| 39 | 46 |
| 40 | 46 |
| 41 | 46 |
| 42 | 45 |
| 43 | 45 |
| 44 | 45 |
| 45 | 45 |
| 46 | 45 |
| 47 | 45 |
| 48 | 44 |
| 49 | 43 |
| 50 | 42 |
| 51 | 43 |
| 52 | 43 |
| 53 | 43 |
| 54 | 42 |
| 55 | 42 |
| 56 | 42 |
| 57 | 42 |
| 58 | 42 |
| 59 | 42 |
| 60 | 41 |
| 61 | 41 |
| 62 | 41 |
| 63 | 41 |
| 64 | 41 |
| 65 | 41 |
| 66 | 40 |
| 67 | 40 |
| 68 | 40 |
| 69 | 40 |
| 70 | 40 |
| 71 | 40 |
| 72 | 40 |
| 73 | 40 |
| 74 | 40 |
| 75 | 40 |
| 76 | 40 |
| 77 | 40 |
| 78 | 40 |
| 79 | 40 |
| 80 | 40 |
| 81 | 39 |
| 82 | 39 |
| 83 | 39 |
| 84 | 39 |
| 85 | 39 |
| 86 | 39 |
| 87 | 38 |
| 88 | 38 |
| 89 | 38 |
| 90 | 38 |
| 91 | 38 |
| 92 | 38 |
| 93 | 37 |
| 94 | 37 |
| 95 | 37 |
| 96 | 37 |
| 97 | 37 |
| 98 | 37 |
| 99 | 37 |
| 100 | 37 |
| 101 | 37 |
| 102 | 37 |
| 103 | 37 |
| 104 | 37 |
| 105 | 37 |
| 106 | 36 |
| 107 | 36 |
| 108 | 36 |
| 109 | 36 |
| 110 | 36 |
| 111 | 36 |
| 112 | 36 |
| 113 | 36 |
| 114 | 36 |
| 115 | 35 |
| 116 | 35 |
| 117 | 35 |
| 118 | 35 |
| 119 | 35 |
| 120 | 35 |
| 121 | 35 |
| 122 | 35 |
| 123 | 35 |
| 124 | 35 |
| 125 | 35 |
| 126 | 35 |
| 127 | 34 |
| 128 | 34 |
| 129 | 34 |
| 130 | 34 |
| 131 | 34 |
| 132 | 34 |
| 133 | 34 |
| 134 | 34 |
| 135 | 33 |
| 136 | 33 |
| 137 | 33 |
| 138 | 33 |
| 139 | 33 |
| 140 | 33 |
| 141 | 32 |
| 142 | 32 |
| 143 | 32 |
| 144 | 32 |
| 145 | 32 |
| 146 | 32 |
| 147 | 32 |
| 148 | 32 |
| 149 | 33 |
| 150 | 32 |
| 151 | 32 |
| 152 | 32 |
| 153 | 32 |
| 154 | 32 |
| 155 | 32 |
| 156 | 32 |
| 157 | 32 |
| 158 | 32 |
| 159 | 32 |
| 160 | 32 |
| 161 | 32 |
| 162 | 32 |
| 163 | 32 |
| 164 | 32 |
| 165 | 31 |
| 166 | 31 |
| 167 | 31 |
| 168 | 31 |
| 169 | 31 |
| 170 | 31 |
| 171 | 31 |
| 172 | 31 |
| 173 | 31 |
| 174 | 31 |
| 175 | 31 |
| 176 | 31 |
| 177 | 31 |
| 178 | 31 |
| 179 | 31 |
| 180 | 31 |
| 181 | 31 |
| 182 | 31 |

TABLE II-continued

| Time (hrs) | Temp. (° C.) |
| --- | --- |
| 183 | 31 |
| 184 | 31 |
| 185 | 31 |
| 186 | 30 |
| 187 | 30 |
| 188 | 30 |
| 189 | 30 |
| 190 | 30 |
| 191 | 30 |
| 192 | 30 |
| 193 | 30 |
| 194 | 30 |
| 195 | 30 |
| 196 | 30 |
| 197 | 30 |
| 198 | 30 |
| 199 | 30 |
| 200 | 30 |
| 201 | 30 |
| 202 | 30 |
| 203 | 30 |
| 204 | 30 |
| 205 | 30 |
| 206 | 30 |
| 207 | 30 |
| 208 | 30 |
| 209 | 30 |
| 210 | 30 |
| 211 | 30 |
| 212 | 30 |
| 213 | 29 |
| 214 | 29 |
| 215 | 29 |
| 216 | 29 |
| 217 | 29 |
| 218 | 30 |
| 219 | 30 |
| 220 | 30 |
| 221 | 30 |
| 222 | 30 |
| 223 | 30 |
| 224 | 30 |
| 225 | 30 |
| 226 | 30 |
| 227 | 30 |
| 228 | 30 |
| 229 | 30 |
| 230 | 30 |
| 231 | 29 |
| 232 | 29 |
| 233 | 29 |
| 234 | 29 |
| 235 | 29 |
| 236 | 29 |
| 237 | 29 |
| 238 | 29 |
| 239 | 29 |
| 240 | 29 |
| 241 | 29 |
| 242 | 29 |
| 243 | 29 |
| 244 | 29 |

TABLE III

| Time (hrs) | Temp. (° C.) |
| --- | --- |
| 0 | 22 |
| 1 | 23 |
| 2 | 25 |
| 3 | 26 |
| 4 | 29 |
| 5 | 33 |
| 6 | 37 |
| 7 | 42 |

TABLE III-continued

| Time (hrs) | Temp. (° C.) |
| --- | --- |
| 8 | 45 |
| 9 | 46 |
| 10 | 48 |
| 11 | 49 |
| 12 | 51 |
| 13 | 52 |
| 14 | 53 |
| 15 | 54 |
| 16 | 54 |
| 17 | 54 |
| 18 | 55 |
| 19 | 55 |
| 20 | 55 |
| 21 | 56 |
| 22 | 56 |
| 23 | 56 |
| 24 | 56 |
| 25 | 56 |
| 26 | 56 |
| 27 | 56 |
| 28 | 57 |
| 29 | 57 |
| 30 | 57 |
| 31 | 57 |
| 32 | 57 |
| 33 | 57 |
| 34 | 57 |
| 35 | 56 |
| 36 | 56 |
| 37 | 56 |
| 38 | 56 |
| 39 | 56 |
| 40 | 56 |
| 41 | 56 |
| 42 | 56 |
| 43 | 55 |
| 44 | 55 |
| 45 | 55 |
| 46 | 55 |
| 47 | 55 |
| 48 | 54 |
| 49 | 54 |
| 50 | 54 |
| 51 | 54 |
| 52 | 54 |
| 53 | 54 |
| 54 | 54 |
| 55 | 53 |
| 56 | 53 |
| 57 | 53 |
| 58 | 53 |
| 59 | 52 |
| 60 | 52 |
| 61 | 51 |
| 62 | 51 |
| 63 | 51 |
| 64 | 51 |
| 65 | 50 |
| 66 | 50 |
| 67 | 50 |
| 68 | 49 |
| 69 | 49 |
| 70 | 49 |
| 71 | 49 |
| 72 | 48 |
| 73 | 48 |
| 74 | 48 |
| 75 | 48 |
| 76 | 48 |
| 77 | 48 |
| 78 | 47 |
| 79 | 47 |
| 80 | 47 |
| 81 | 47 |
| 82 | 47 |
| 83 | 46 |
| 84 | 46 |
| 85 | 46 |

TABLE III-continued

| Time (hrs) | Temp. (° C.) |
|---|---|
| 86 | 46 |
| 87 | 46 |
| 88 | 46 |
| 89 | 45 |
| 90 | 45 |
| 91 | 45 |
| 92 | 45 |
| 93 | 44 |
| 94 | 44 |
| 95 | 44 |
| 96 | 44 |
| 97 | 44 |
| 98 | 44 |
| 99 | 43 |
| 100 | 43 |
| 101 | 43 |
| 102 | 43 |
| 103 | 43 |
| 104 | 43 |
| 105 | 42 |
| 106 | 42 |
| 107 | 42 |
| 108 | 42 |
| 109 | 42 |
| 110 | 41 |
| 111 | 41 |
| 112 | 41 |
| 113 | 41 |
| 114 | 41 |
| 115 | 40 |
| 116 | 40 |
| 117 | 40 |
| 118 | 40 |
| 119 | 40 |
| 120 | 40 |
| 121 | 40 |
| 122 | 40 |
| 123 | 40 |
| 124 | 40 |
| 125 | 40 |
| 126 | 40 |
| 127 | 40 |
| 128 | 39 |
| 129 | 39 |
| 130 | 39 |
| 131 | 39 |
| 132 | 39 |
| 133 | 39 |
| 134 | 38 |
| 135 | 38 |
| 136 | 38 |
| 137 | 38 |
| 138 | 38 |
| 139 | 38 |
| 140 | 37 |
| 141 | 37 |
| 142 | 37 |
| 143 | 37 |
| 144 | 37 |
| 145 | 37 |
| 146 | 37 |
| 147 | 37 |
| 148 | 37 |
| 149 | 37 |
| 150 | 37 |
| 151 | 37 |
| 152 | 36 |
| 153 | 36 |
| 154 | 36 |
| 155 | 36 |
| 156 | 36 |
| 157 | 36 |
| 158 | 36 |
| 159 | 36 |
| 160 | 36 |
| 161 | 36 |
| 162 | 36 |
| 163 | 35 |
| 164 | 35 |
| 165 | 35 |
| 166 | 35 |
| 167 | 35 |
| 168 | 35 |
| 169 | 35 |
| 170 | 35 |
| 171 | 35 |
| 172 | 35 |
| 173 | 35 |
| 174 | 35 |
| 175 | 34 |
| 176 | 34 |
| 177 | 34 |
| 178 | 34 |
| 179 | 34 |
| 180 | 34 |
| 181 | 34 |
| 182 | 34 |
| 183 | 34 |
| 184 | 33 |
| 185 | 33 |
| 186 | 33 |
| 187 | 33 |
| 188 | 33 |
| 189 | 33 |
| 190 | 32 |
| 191 | 32 |
| 192 | 32 |
| 193 | 32 |
| 194 | 32 |
| 195 | 32 |
| 196 | 32 |
| 197 | 32 |
| 198 | 32 |
| 199 | 32 |
| 200 | 32 |
| 201 | 31 |
| 202 | 31 |
| 203 | 31 |
| 204 | 31 |
| 205 | 31 |
| 206 | 31 |
| 207 | 30 |
| 208 | 30 |
| 209 | 30 |
| 210 | 30 |
| 211 | 30 |
| 212 | 30 |
| 213 | 29 |
| 214 | 29 |
| 215 | 29 |
| 216 | 29 |
| 217 | 29 |
| 218 | 29 |
| 219 | 29 |
| 220 | 29 |
| 221 | 29 |
| 222 | 29 |
| 223 | 29 |
| 224 | 29 |
| 225 | 29 |
| 226 | 29 |
| 227 | 29 |
| 228 | 28 |
| 229 | 28 |
| 230 | 28 |
| 231 | 28 |
| 232 | 28 |
| 233 | 28 |
| 234 | 27 |
| 235 | 27 |
| 236 | 27 |
| 237 | 27 |
| 238 | 27 |
| 239 | 27 |
| 240 | 27 |
| 241 | 27 |

TABLE III-continued

| Time (hrs) | Temp. (° C.) |
|---|---|
| 242 | 27 |
| 243 | 27 |
| 244 | 27 |
| 245 | 27 |
| 246 | 27 |
| 247 | 27 |
| 248 | 26 |
| 249 | 26 |
| 250 | 26 |
| 251 | 26 |
| 252 | 26 |
| 253 | 26 |
| 254 | 26 |
| 255 | 26 |
| 256 | 26 |
| 257 | 26 |
| 258 | 26 |
| 259 | 26 |
| 260 | 26 |
| 261 | 26 |
| 262 | 26 |
| 263 | 25 |
| 264 | 25 |
| 265 | 25 |
| 266 | 25 |
| 267 | 25 |
| 268 | 25 |
| 269 | 25 |
| 270 | 25 |
| 271 | 25 |
| 272 | 25 |
| 273 | 25 |
| 274 | 25 |
| 275 | 25 |
| 276 | 25 |
| 277 | 25 |
| 278 | 25 |
| 279 | 25 |
| 280 | 25 |
| 281 | 24 |
| 282 | 24 |
| 283 | 24 |
| 284 | 24 |
| 285 | 24 |
| 286 | 24 |
| 287 | 24 |
| 288 | 24 |
| 289 | 24 |
| 290 | 24 |
| 291 | 24 |
| 292 | 24 |
| 293 | 24 |
| 294 | 24 |
| 295 | 24 |
| 296 | 23 |
| 297 | 23 |
| 298 | 23 |
| 299 | 23 |
| 300 | 23 |
| 301 | 23 |
| 302 | 23 |
| 303 | 23 |
| 304 | 23 |
| 305 | 23 |
| 306 | 23 |
| 307 | 23 |
| 308 | 23 |
| 309 | 22 |
| 310 | 22 |
| 311 | 22 |
| 312 | 22 |
| 313 | 22 |
| 314 | 22 |
| 315 | 22 |
| 316 | 22 |
| 317 | 22 |
| 318 | 22 |
| 319 | 22 |

TABLE III-continued

| Time (hrs) | Temp. (° C.) |
|---|---|
| 320 | 22 |
| 321 | 22 |
| 322 | 22 |
| 323 | 22 |
| 324 | 22 |
| 325 | 22 |
| 326 | 22 |
| 327 | 22 |
| 328 | 22 |
| 329 | 22 |
| 330 | 21 |
| 331 | 21 |
| 332 | 21 |
| 333 | 21 |
| 334 | 21 |
| 335 | 21 |
| 336 | 21 |

TABLE IV

| Time (hrs) | Temp. (° C.) |
|---|---|
| 0 | 26 |
| 1 | 26 |
| 2 | 26 |
| 3 | 27 |
| 4 | 28 |
| 5 | 29 |
| 6 | 31 |
| 7 | 31 |
| 8 | 31 |
| 9 | 31 |
| 10 | 30 |
| 11 | 30 |
| 12 | 29 |
| 13 | 29 |
| 14 | 28 |
| 15 | 28 |
| 16 | 28 |
| 17 | 27 |
| 18 | 27 |
| 19 | 27 |
| 20 | 26 |
| 21 | 26 |
| 22 | 26 |
| 23 | 30 |
| 24 | 34 |
| 25 | 38 |
| 26 | 42 |
| 27 | 44 |
| 28 | 44 |
| 29 | 41 |
| 30 | 39 |
| 31 | 38 |
| 32 | 36 |
| 33 | 35 |
| 34 | 34 |
| 35 | 33 |
| 36 | 32 |
| 37 | 31 |
| 38 | 30 |
| 39 | 29 |
| 40 | 29 |
| 41 | 28 |
| 42 | 28 |
| 43 | 27 |
| 44 | 26 |
| 45 | 26 |
| 46 | 26 |
| 47 | 29 |
| 48 | 31 |
| 49 | 31 |
| 50 | 34 |
| 51 | 38 |
| 52 | 37 |

TABLE IV-continued

| Time (hrs) | Temp. (° C.) |
|---|---|
| 53 | 36 |
| 54 | 35 |
| 55 | 34 |
| 56 | 34 |
| 57 | 33 |
| 58 | 31 |
| 59 | 30 |
| 60 | 29 |
| 61 | 29 |
| 62 | 28 |
| 63 | 28 |
| 64 | 27 |
| 65 | 27 |
| 66 | 26 |
| 67 | 26 |
| 68 | 26 |
| 69 | 26 |
| 70 | 27 |
| 71 | 29 |
| 72 | 31 |
| 73 | 32 |
| 74 | 33 |
| 75 | 36 |
| 76 | 38 |
| 77 | 37 |
| 78 | 36 |
| 79 | 35 |
| 80 | 33 |
| 81 | 32 |
| 82 | 32 |
| 83 | 31 |
| 84 | 30 |
| 85 | 29 |
| 86 | 29 |
| 87 | 29 |
| 88 | 28 |
| 89 | 28 |
| 90 | 27 |
| 91 | 27 |
| 92 | 27 |
| 93 | 27 |
| 94 | 27 |
| 95 | 29 |
| 96 | 31 |
| 97 | 34 |
| 98 | 36 |
| 99 | 38 |
| 100 | 39 |
| 101 | 37 |
| 102 | 36 |
| 103 | 35 |
| 104 | 34 |
| 105 | 33 |
| 106 | 32 |
| 107 | 31 |
| 108 | 30 |
| 109 | 29 |
| 110 | 29 |
| 111 | 28 |
| 112 | 27 |
| 113 | 27 |
| 114 | 26 |
| 115 | 26 |
| 116 | 26 |
| 117 | 26 |
| 118 | 26 |
| 119 | 29 |
| 120 | 32 |
| 121 | 34 |
| 122 | 35 |
| 123 | 36 |
| 124 | 36 |
| 125 | 36 |
| 126 | 35 |
| 127 | 33 |
| 128 | 32 |
| 129 | 32 |
| 130 | 31 |
| 131 | 30 |
| 132 | 29 |
| 133 | 28 |
| 134 | 28 |
| 135 | 27 |
| 136 | 26 |
| 137 | 26 |
| 138 | 26 |
| 139 | 25 |
| 140 | 25 |
| 141 | 25 |
| 142 | 25 |
| 143 | 29 |
| 144 | 32 |
| 145 | 36 |
| 146 | 39 |
| 147 | 41 |
| 148 | 42 |
| 149 | 40 |
| 150 | 38 |
| 151 | 37 |
| 152 | 36 |
| 153 | 34 |
| 154 | 33 |
| 155 | 32 |
| 156 | 31 |
| 157 | 30 |
| 158 | 29 |
| 159 | 29 |
| 160 | 28 |
| 161 | 28 |
| 162 | 27 |
| 163 | 26 |
| 164 | 26 |
| 165 | 26 |
| 166 | 27 |
| 167 | 29 |
| 168 | 32 |
| 169 | 33 |
| 170 | 33 |
| 171 | 35 |
| 172 | 36 |
| 173 | 34 |
| 174 | 33 |
| 175 | 33 |
| 176 | 32 |
| 177 | 31 |
| 178 | 30 |
| 179 | 29 |
| 180 | 29 |
| 181 | 28 |
| 182 | 28 |
| 183 | 27 |
| 184 | 27 |
| 185 | 26 |
| 186 | 26 |
| 187 | 26 |
| 188 | 26 |
| 189 | 26 |
| 190 | 26 |
| 191 | 29 |
| 192 | 32 |
| 193 | 35 |
| 194 | 37 |
| 195 | 39 |
| 196 | 40 |
| 197 | 39 |
| 198 | 37 |
| 199 | 36 |
| 200 | 35 |
| 201 | 34 |
| 202 | 32 |
| 203 | 32 |
| 204 | 31 |
| 205 | 30 |
| 206 | 29 |
| 207 | 29 |
| 208 | 28 |

TABLE IV-continued

| Time (hrs) | Temp. (° C.) |
|---|---|
| 209 | 28 |
| 210 | 27 |
| 211 | 27 |
| 212 | 27 |
| 213 | 27 |
| 214 | 27 |
| 215 | 29 |
| 216 | 32 |
| 217 | 35 |
| 218 | 37 |
| 219 | 39 |
| 220 | 39 |
| 221 | 38 |
| 222 | 37 |
| 223 | 36 |
| 224 | 35 |
| 225 | 33 |
| 226 | 32 |
| 227 | 32 |
| 228 | 31 |
| 229 | 30 |
| 230 | 29 |
| 231 | 29 |
| 232 | 29 |
| 233 | 28 |
| 234 | 28 |
| 235 | 27 |
| 236 | 27 |
| 237 | 27 |
| 238 | 27 |
| 239 | 29 |
| 240 | 32 |
| 241 | 35 |
| 242 | 37 |
| 243 | 39 |
| 244 | 40 |
| 245 | 39 |
| 246 | 38 |
| 247 | 37 |
| 248 | 36 |
| 249 | 35 |
| 250 | 33 |
| 251 | 32 |
| 252 | 32 |
| 253 | 31 |
| 254 | 30 |
| 255 | 30 |
| 256 | 29 |
| 257 | 29 |
| 258 | 28 |
| 259 | 28 |
| 260 | 28 |
| 261 | 28 |
| 262 | 28 |
| 263 | 30 |
| 264 | 34 |
| 265 | 36 |
| 266 | 38 |
| 267 | 39 |
| 268 | 39 |
| 269 | 38 |
| 270 | 37 |
| 271 | 37 |
| 272 | 33 |
| 273 | 32 |
| 274 | 31 |
| 275 | 30 |
| 276 | 29 |
| 277 | 29 |
| 278 | 29 |
| 279 | 29 |
| 280 | 28 |
| 281 | 28 |
| 282 | 27 |
| 283 | 27 |
| 284 | 27 |
| 285 | 27 |
| 286 | 27 |
| 287 | 29 |
| 288 | 33 |
| 289 | 37 |
| 290 | 40 |
| 291 | 42 |
| 292 | 43 |
| 293 | 41 |
| 294 | 40 |
| 295 | 38 |
| 296 | 37 |
| 297 | 36 |
| 298 | 35 |
| 299 | 33 |
| 300 | 33 |
| 301 | 32 |
| 302 | 32 |
| 303 | 31 |
| 304 | 31 |
| 305 | 30 |
| 306 | 29 |
| 307 | 29 |
| 308 | 29 |
| 309 | 29 |
| 310 | 30 |
| 311 | 32 |
| 312 | 35 |
| 313 | 38 |
| 314 | 40 |
| 315 | 41 |
| 316 | 40 |
| 317 | 40 |
| 318 | 39 |
| 319 | 38 |
| 320 | 36 |
| 321 | 36 |
| 322 | 34 |
| 323 | 33 |
| 324 | 33 |
| 325 | 32 |
| 326 | 32 |
| 327 | 31 |
| 328 | 30 |
| 329 | 30 |
| 330 | 29 |
| 331 | 29 |
| 332 | 29 |
| 333 | 29 |
| 334 | 29 |
| 335 | 31 |
| 336 | 34 |

TABLE V

| Time (hrs) | Temp. (° C.) |
|---|---|
| 0 | 21 |
| 1 | 21 |
| 2 | 22 |
| 3 | 23 |
| 4 | 22 |
| 5 | 23 |
| 6 | 24 |
| 7 | 24 |
| 8 | 25 |
| 9 | 24 |
| 10 | 23 |
| 11 | 23 |
| 12 | 23 |
| 13 | 23 |
| 14 | 23 |
| 15 | 22 |
| 16 | 22 |
| 17 | 22 |
| 18 | 22 |
| 19 | 22 |

TABLE V-continued

| Time (hrs) | Temp. (° C.) |
|---|---|
| 20 | 22 |
| 21 | 21 |
| 22 | 22 |
| 23 | 22 |
| 24 | 23 |
| 25 | 25 |
| 26 | 26 |
| 27 | 30 |
| 28 | 31 |
| 29 | 30 |
| 30 | 29 |
| 31 | 29 |
| 32 | 29 |
| 33 | 29 |
| 34 | 28 |
| 35 | 26 |
| 36 | 25 |
| 37 | 24 |
| 38 | 23 |
| 39 | 23 |
| 40 | 22 |
| 41 | 21 |
| 42 | 21 |
| 43 | 20 |
| 44 | 20 |
| 45 | 20 |
| 46 | 20 |
| 47 | 23 |
| 48 | 25 |
| 49 | 28 |
| 50 | 29 |
| 51 | 31 |
| 52 | 32 |
| 53 | 33 |
| 54 | 31 |
| 55 | 31 |
| 56 | 29 |
| 57 | 29 |
| 58 | 28 |
| 59 | 26 |
| 60 | 23 |
| 61 | 22 |
| 62 | 22 |
| 63 | 21 |
| 64 | 22 |
| 65 | 22 |
| 66 | 22 |
| 67 | 21 |
| 68 | 21 |
| 69 | 21 |
| 70 | 22 |
| 71 | 23 |
| 72 | 24 |
| 73 | 25 |
| 74 | 26 |
| 75 | 26 |
| 76 | 25 |
| 77 | 28 |
| 78 | 29 |
| 79 | 29 |
| 80 | 29 |
| 81 | 27 |
| 82 | 26 |
| 83 | 26 |
| 84 | 25 |
| 85 | 24 |
| 86 | 23 |
| 87 | 23 |
| 88 | 23 |
| 89 | 22 |
| 90 | 21 |
| 91 | 21 |
| 92 | 21 |
| 93 | 21 |
| 94 | 21 |
| 95 | 23 |
| 96 | 24 |
| 97 | 26 |

TABLE V-continued

| Time (hrs) | Temp. (° C.) |
|---|---|
| 98 | 26 |
| 99 | 29 |
| 100 | 29 |
| 101 | 29 |
| 102 | 29 |
| 103 | 28 |
| 104 | 28 |
| 105 | 27 |
| 106 | 26 |
| 107 | 25 |
| 108 | 24 |
| 109 | 23 |
| 110 | 22 |
| 111 | 21 |
| 112 | 20 |
| 113 | 20 |
| 114 | 20 |
| 115 | 19 |
| 116 | 18 |
| 117 | 18 |
| 118 | 19 |
| 119 | 21 |
| 120 | 24 |
| 121 | 26 |
| 122 | 26 |
| 123 | 28 |
| 124 | 27 |
| 125 | 28 |
| 126 | 28 |
| 127 | 28 |
| 128 | 27 |
| 129 | 26 |
| 130 | 26 |
| 131 | 25 |
| 132 | 23 |
| 133 | 22 |
| 134 | 20 |
| 135 | 20 |
| 136 | 19 |
| 137 | 18 |
| 138 | 17 |
| 139 | 17 |
| 140 | 17 |
| 141 | 16 |
| 142 | 18 |
| 143 | 21 |
| 144 | 24 |
| 145 | 26 |
| 146 | 28 |
| 147 | 32 |
| 148 | 32 |
| 149 | 32 |
| 150 | 31 |
| 151 | 29 |
| 152 | 29 |
| 153 | 27 |
| 154 | 26 |
| 155 | 24 |
| 156 | 23 |
| 157 | 22 |
| 158 | 21 |
| 159 | 21 |
| 160 | 20 |
| 161 | 19 |
| 162 | 19 |
| 163 | 18 |
| 164 | 18 |
| 165 | 18 |
| 166 | 19 |
| 167 | 21 |
| 168 | 24 |
| 169 | 26 |
| 170 | 29 |
| 171 | 31 |
| 172 | 31 |
| 173 | 31 |
| 174 | 31 |
| 175 | 30 |

TABLE V-continued

| Time (hrs) | Temp. (° C.) |
|---|---|
| 176 | 28 |
| 177 | 28 |
| 178 | 26 |
| 179 | 25 |
| 180 | 24 |
| 181 | 23 |
| 182 | 22 |
| 183 | 21 |
| 184 | 21 |
| 185 | 20 |
| 186 | 20 |
| 187 | 20 |
| 188 | 19 |
| 189 | 19 |
| 190 | 20 |
| 191 | 22 |
| 192 | 25 |
| 193 | 27 |
| 194 | 29 |
| 195 | 32 |
| 196 | 32 |
| 197 | 32 |
| 198 | 32 |
| 199 | 31 |
| 200 | 30 |
| 201 | 30 |
| 202 | 28 |
| 203 | 26 |
| 204 | 25 |
| 205 | 23 |
| 206 | 23 |
| 207 | 22 |
| 208 | 21 |
| 209 | 20 |
| 210 | 20 |
| 211 | 20 |
| 212 | 20 |
| 213 | 20 |
| 214 | 20 |
| 215 | 23 |
| 216 | 26 |
| 217 | 28 |
| 218 | 29 |
| 219 | 32 |
| 220 | 32 |
| 221 | 33 |
| 222 | 32 |
| 223 | 31 |
| 224 | 30 |
| 225 | 29 |
| 226 | 28 |
| 227 | 26 |
| 228 | 25 |
| 229 | 24 |
| 230 | 23 |
| 231 | 23 |
| 232 | 22 |
| 233 | 21 |
| 234 | 21 |
| 235 | 21 |
| 236 | 20 |
| 237 | 20 |
| 238 | 21 |
| 239 | 23 |
| 240 | 26 |
| 241 | 28 |
| 242 | 30 |
| 243 | 32 |
| 244 | 33 |
| 245 | 34 |
| 246 | 33 |
| 247 | 31 |
| 248 | 31 |
| 249 | 30 |
| 250 | 29 |
| 251 | 28 |
| 252 | 26 |
| 253 | 25 |

TABLE V-continued

| Time (hrs) | Temp. (° C.) |
|---|---|
| 254 | 24 |
| 255 | 23 |
| 256 | 23 |
| 257 | 23 |
| 258 | 22 |
| 259 | 21 |
| 260 | 21 |
| 261 | 21 |
| 262 | 22 |
| 263 | 24 |
| 264 | 27 |
| 265 | 29 |
| 266 | 32 |
| 267 | 34 |
| 268 | 34 |
| 269 | 34 |
| 270 | 34 |
| 271 | 33 |
| 272 | 32 |
| 273 | 32 |
| 274 | 23 |
| 275 | 22 |
| 276 | 22 |
| 277 | 23 |
| 278 | 23 |
| 279 | 23 |
| 280 | 23 |
| 281 | 23 |
| 282 | 22 |
| 283 | 22 |
| 284 | 22 |
| 285 | 21 |
| 286 | 22 |
| 287 | 23 |
| 288 | 26 |
| 289 | 28 |
| 290 | 29 |
| 291 | 33 |
| 292 | 34 |
| 293 | 34 |
| 294 | 33 |
| 295 | 32 |
| 296 | 32 |
| 297 | 29 |
| 298 | 29 |
| 299 | 29 |
| 300 | 27 |
| 301 | 26 |
| 302 | 26 |
| 303 | 26 |
| 304 | 25 |
| 305 | 25 |
| 306 | 24 |
| 307 | 24 |
| 308 | 24 |
| 309 | 23 |
| 310 | 24 |
| 311 | 24 |
| 312 | 27 |
| 313 | 29 |
| 314 | 31 |
| 315 | 34 |
| 316 | 35 |
| 317 | 34 |
| 318 | 33 |
| 319 | 34 |
| 320 | 32 |
| 321 | 30 |
| 322 | 29 |
| 323 | 28 |
| 324 | 27 |
| 325 | 26 |
| 326 | 26 |
| 327 | 25 |
| 328 | 24 |
| 329 | 24 |
| 330 | 23 |
| 331 | 23 |

TABLE V-continued

| Time (hrs) | Temp. (° C.) |
| --- | --- |
| 332 | 23 |
| 333 | 23 |
| 334 | 23 |
| 335 | 23 |
| 336 | 26 |

TABLE VI

| Time (hrs) | Temp. (° C.) |
| --- | --- |
| 0.00 | 20 |
| 0.25 | 18 |
| 0.50 | 17 |
| 0.75 | 17 |
| 1.00 | 20 |
| 1.25 | 22 |
| 1.50 | 21 |
| 1.75 | 21 |
| 2.00 | 20 |
| 2.25 | 20 |
| 2.50 | 20 |
| 2.75 | 20 |
| 3.00 | 20 |
| 3.25 | 20 |
| 3.50 | 19 |
| 3.75 | 19 |
| 4.00 | 19 |
| 4.25 | 19 |
| 4.50 | 19 |
| 4.75 | 19 |
| 5.00 | 19 |
| 5.25 | 19 |
| 5.50 | 19 |
| 5.75 | 20 |
| 6.00 | 20 |
| 6.25 | 20 |
| 6.50 | 20 |
| 6.75 | 20 |
| 7.00 | 20 |
| 7.25 | 20 |
| 7.50 | 20 |
| 7.75 | 20 |
| 8.00 | 20 |
| 8.25 | 20 |
| 8.50 | 20 |
| 8.75 | 20 |
| 9.00 | 20 |
| 9.25 | 20 |
| 9.50 | 20 |
| 9.75 | 20 |
| 10.00 | 20 |
| 10.25 | 20 |
| 10.50 | 20 |
| 10.75 | 20 |
| 11.00 | 20 |
| 11.25 | 20 |
| 11.50 | 20 |
| 11.75 | 20 |
| 12.00 | 20 |
| 12.25 | 20 |
| 12.50 | 20 |
| 12.75 | 20 |
| 13.00 | 20 |
| 13.25 | 20 |
| 13.50 | 20 |
| 13.75 | 20 |
| 14.00 | 20 |
| 14.25 | 19 |
| 14.50 | 19 |
| 14.75 | 18 |
| 15.00 | 18 |
| 15.25 | 18 |
| 15.50 | 18 |
| 15.75 | 17 |
| 16.00 | 17 |

TABLE VI-continued

| Time (hrs) | Temp. (° C.) |
| --- | --- |
| 16.25 | 17 |
| 16.50 | 17 |
| 16.75 | 17 |
| 17.00 | 17 |
| 17.25 | 17 |
| 17.50 | 17 |
| 17.75 | 17 |
| 18.00 | 17 |
| 18.25 | 17 |
| 18.50 | 17 |
| 18.75 | 17 |
| 19.00 | 17 |
| 19.25 | 17 |
| 19.50 | 17 |
| 19.75 | 17 |
| 20.00 | 17 |
| 20.25 | 17 |
| 20.50 | 17 |
| 20.75 | 17 |
| 21.00 | 17 |
| 21.25 | 16 |
| 21.50 | 16 |
| 21.75 | 16 |
| 22.00 | 16 |
| 22.25 | 16 |
| 22.50 | 16 |
| 22.75 | 16 |
| 23.00 | 16 |
| 23.25 | 16 |
| 23.50 | 16 |
| 23.75 | 16 |
| 24.00 | 16 |
| 24.25 | 16 |
| 24.50 | 16 |
| 24.75 | 16 |
| 25.00 | 16 |
| 25.25 | 16 |
| 25.50 | 17 |
| 25.75 | 17 |
| 26.00 | 17 |
| 26.25 | 17 |
| 26.50 | 17 |
| 26.75 | 17 |
| 27.00 | 17 |
| 27.25 | 17 |
| 27.50 | 17 |
| 27.75 | 17 |
| 28.00 | 17 |
| 28.25 | 17 |
| 28.50 | 17 |
| 28.75 | 17 |
| 29.00 | 17 |
| 29.25 | 17 |
| 29.50 | 17 |
| 29.75 | 17 |
| 30.00 | 17 |
| 30.25 | 17 |
| 30.50 | 17 |
| 30.75 | 17 |
| 31.00 | 17 |
| 31.25 | 17 |
| 31.50 | 17 |
| 31.75 | 17 |
| 32.00 | 17 |
| 32.25 | 18 |
| 32.50 | 18 |
| 32.75 | 18 |
| 33.00 | 18 |
| 33.25 | 18 |
| 33.50 | 18 |
| 33.75 | 18 |
| 34.00 | 18 |
| 34.25 | 18 |
| 34.50 | 18 |
| 34.75 | 18 |
| 35.00 | 18 |
| 35.25 | 17 |
| 35.50 | 17 |

TABLE VI-continued

| Time (hrs) | Temp. (° C.) |
|---|---|
| 35.75 | 17 |
| 36.00 | 17 |
| 36.25 | 17 |
| 36.50 | 17 |
| 36.75 | 17 |
| 37.00 | 17 |
| 37.25 | 17 |
| 37.50 | 17 |
| 37.75 | 17 |
| 38.00 | 17 |
| 38.25 | 17 |
| 38.50 | 17 |
| 38.75 | 17 |
| 39.00 | 17 |
| 39.25 | 17 |
| 39.50 | 17 |
| 39.75 | 17 |
| 40.00 | 17 |
| 40.25 | 17 |
| 40.50 | 17 |
| 40.75 | 17 |
| 41.00 | 17 |
| 41.25 | 17 |
| 41.50 | 17 |
| 41.75 | 17 |
| 42.00 | 17 |
| 42.25 | 17 |
| 42.50 | 17 |
| 42.75 | 17 |
| 43.00 | 17 |
| 43.25 | 17 |
| 43.50 | 17 |
| 43.75 | 17 |
| 44.00 | 17 |
| 44.25 | 17 |
| 44.50 | 17 |
| 44.75 | 17 |
| 45.00 | 17 |
| 45.25 | 17 |
| 45.50 | 17 |
| 45.75 | 17 |
| 46.00 | 17 |
| 46.25 | 17 |
| 46.50 | 17 |
| 46.75 | 17 |
| 47.00 | 17 |
| 47.25 | 17 |
| 47.50 | 17 |
| 47.75 | 17 |
| 48.00 | 17 |
| 48.25 | 17 |
| 48.50 | 17 |
| 48.75 | 17 |
| 49.00 | 17 |
| 49.25 | 17 |
| 49.50 | 17 |
| 49.75 | 17 |
| 50.00 | 17 |
| 50.25 | 17 |
| 50.50 | 17 |
| 50.75 | 17 |
| 51.00 | 17 |
| 51.25 | 17 |
| 51.50 | 17 |
| 51.75 | 17 |
| 52.00 | 17 |
| 52.25 | 17 |
| 52.50 | 17 |
| 52.75 | 17 |
| 53.00 | 17 |
| 53.25 | 17 |
| 53.50 | 17 |
| 53.75 | 17 |
| 54.00 | 17 |
| 54.25 | 17 |
| 54.50 | 17 |
| 54.75 | 17 |
| 55.00 | 17 |
| 55.25 | 17 |
| 55.50 | 17 |
| 55.75 | 17 |
| 56.00 | 17 |
| 56.25 | 17 |
| 56.50 | 17 |
| 56.75 | 17 |
| 57.00 | 17 |
| 57.25 | 17 |
| 57.50 | 17 |
| 57.75 | 17 |
| 58.00 | 17 |
| 58.25 | 17 |
| 58.50 | 17 |
| 58.75 | 17 |
| 59.00 | 17 |
| 59.25 | 17 |
| 59.50 | 17 |
| 59.75 | 17 |
| 60.00 | 17 |
| 60.25 | 17 |
| 60.50 | 17 |
| 60.75 | 17 |
| 61.00 | 17 |
| 61.25 | 17 |
| 61.50 | 17 |
| 61.75 | 17 |
| 62.00 | 17 |
| 62.25 | 17 |
| 62.50 | 17 |
| 62.75 | 17 |
| 63.00 | 17 |
| 63.25 | 17 |
| 63.50 | 17 |
| 63.75 | 17 |
| 64.00 | 17 |
| 64.25 | 17 |
| 64.50 | 17 |
| 64.75 | 17 |
| 65.00 | 16 |
| 65.25 | 16 |
| 65.50 | 16 |
| 65.75 | 16 |
| 66.00 | 16 |
| 66.25 | 16 |
| 66.50 | 16 |
| 66.75 | 16 |
| 67.00 | 16 |
| 67.25 | 16 |
| 67.50 | 16 |
| 67.75 | 16 |
| 68.00 | 16 |
| 68.25 | 16 |
| 68.50 | 16 |
| 68.75 | 16 |
| 69.00 | 16 |
| 69.25 | 16 |
| 69.50 | 15 |
| 69.75 | 15 |
| 70.00 | 15 |
| 70.25 | 15 |
| 70.50 | 15 |
| 70.75 | 15 |
| 71.00 | 15 |
| 71.25 | 15 |
| 71.50 | 15 |
| 71.75 | 15 |
| 72.00 | 15 |
| 72.25 | 15 |
| 72.50 | 15 |
| 72.75 | 15 |
| 73.00 | 15 |
| 73.25 | 15 |
| 73.50 | 15 |
| 73.75 | 16 |
| 74.00 | 16 |
| 74.25 | 16 |
| 74.50 | 16 |

TABLE VI-continued

| Time (hrs) | Temp. (° C.) |
|---|---|
| 74.75 | 16 |
| 75.00 | 17 |
| 75.25 | 17 |
| 75.50 | 17 |
| 75.75 | 17 |
| 76.00 | 18 |
| 76.25 | 18 |
| 76.50 | 18 |
| 76.75 | 18 |
| 77.00 | 18 |
| 77.25 | 18 |
| 77.50 | 18 |
| 77.75 | 18 |
| 78.00 | 18 |
| 78.25 | 18 |
| 78.50 | 19 |
| 78.75 | 19 |
| 79.00 | 19 |
| 79.25 | 19 |
| 79.50 | 19 |
| 79.75 | 20 |
| 80.00 | 20 |
| 80.25 | 20 |
| 80.50 | 21 |
| 80.75 | 21 |
| 81.00 | 22 |
| 81.25 | 22 |
| 81.50 | 22 |
| 81.75 | 21 |
| 82.00 | 21 |
| 82.25 | 21 |
| 82.50 | 20 |
| 82.75 | 20 |
| 83.00 | 20 |
| 83.25 | 20 |
| 83.50 | 20 |
| 83.75 | 20 |
| 84.00 | 20 |
| 84.25 | 20 |
| 84.50 | 20 |
| 84.75 | 20 |
| 85.00 | 20 |
| 85.25 | 19 |

The predetermined temperature profiles, as shown in Tables I-VI above, may be useful for specific concrete mix designs. Other predetermined temperature profiles may be appropriate for other concrete mix designs. Of course, any desired temperature profile can be used as the predetermined temperature profile for use in the present invention. An advantage of the present invention is that it can be used to determine an optimal predetermined concrete curing temperature profile to produce concrete of a specific concrete mix design having desired improved physical properties, such as compressive strength, permeability, and the like. Once an optimal predetermined concrete curing temperature profile is determined, it can then be replicated at a construction site for that specific concrete mix design using a temperature controllable concrete form, such as the concrete forming systems disclosed in U.S. Pat. Nos. 8,532,815 and 9,074,379 and applicant's co-pending patent application Ser. No. 14/275,833 filed May 12, 2014 (the disclosures of which are all incorporated herein by reference in their entirety). This allows the production of concrete cured under desired, reproducible conditions, which thereby assures the desired physical properties of the concrete.

The process then proceeds from the block 112 to the decision block 114. At the decision block 114 the temperature of the water is compared to the profile temperature corresponding to the stored clock time. If the water temperature is greater than the profile temperature, the process proceeds to the block 118. When this condition is encountered, the water temperature is greater than the profile temperature, so it is necessary to reduce the temperature of the water. At the block 118 the temperature of the water is reduced. This can be done in one of two ways. It can be done in an active manner where the water is actively cooled or it can be done in a somewhat passive manner where the amount of heat provided to the water by the electric resistance heating element 24 is reduced and the temperature of the water is allowed to reduce by heat leaking through the insulated walls of the concrete curing container 10. If the concrete curing container 10 is equipped with the optional water cooling system 32, for the actively cooled system, a signal is sent from the computing device 42 to the compressor controller 52 to turn on the compressor 38. Coolant is then circulated through the cooling coil 34 and heat is removed from the water 32. The other way of cooling the water 32 is for the computing device to send a signal to the electric resistance heating element controller 44 to reduce the amount of heat produced by the electric resistance heating element 24. This can be done by reducing the voltage of the electricity provided to the electric resistance heating coil or by reducing the time that the electric resistance heating element 24 is energized. The process then from the block 118 to the block 120. At the block 120, a predetermined wait time is executed before the process proceeds from the block 120 to the block 104 where a new clock time is read. The wait time can be any desired time that is suitable for the water temperature being measured, such as one second, ten seconds, 30 seconds, one minute, one hour and the like. If the water temperature of the concrete is less than or equal to the profile temperature, the process proceeds from the block 114 to the decision block 116.

At the decision block 116, the water temperature is compared to the profile temperature corresponding to the stored clock time. If the water temperature is equal to the profile temperature, the process proceeds from the block 116 to the block 120. If the water temperature is not equal to the profile temperature, the process proceeds to the decision block 122.

At the decision block 122, the water temperature is compared to the profile temperature. If the water temperature is greater than or equal to the profile temperature, the process proceeds to the block 120. If the water temperature is less than the profile temperature, the process proceeds to the block 124.

At the block 124, the temperature of the water is increased. This can be done by the computing device 42 sending a signal to the electric resistance heating coil controller 44 to increase the temperature of the electrically resistance heating coil. This can be done by increasing the voltage of the electricity provided to the electric resistance heating coil or by increasing the time that the electric resistance heating coil is energized. The process then proceeds from the block 124 to the block 126.

At the block 126, a predetermined wait time is executed before the process proceeds from the block 126 to the block 104. The wait time can be any desired time that is suitable for the water temperature being measured, such as one second, ten seconds, 30 seconds, one minute, one hour and the like. The process then proceeds from the block 126 to the block 104 where a new clock time is read.

The foregoing process regulates the heat added to the water by the electric resistance heating coil 24 or removed from the water by the cooling system 33 so that the temperature of the water is equal to the profile temperature at any given time. When the temperature of the water is less than the profile temperature at a given curing time, the electric resistance heating coil 24 provides heat to the water until the temperature of the water is equal to the profile temperature. When the temperature of the water 32 is greater than the profile temperature at a given curing time, no additional heat or a reduced amount of heat or heat is actively removed from the water. Thus, the temperature of the water 32 is continuously monitored and adjusted so that over time the water temperature will follow the predetermined temperature profile. Thus, over a predetermined time period the water temperature is maintained at predetermined levels that reduce to ambient temperature at a predetermined rate.

The present invention can be used with any concrete mix. Concrete comprises one or more cementitious materials, aggregate and water sufficient to hydrate the cementitious material. The particular concrete mix is not a critical feature of the present application. Traditional concrete uses portland cement as the only cementitious material in the concrete. However, any hydraulic cement or combination of hydraulic cements can be used as the cementitious material. Chemical admixtures and/or mineral admixtures can also be used.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A method of curing concrete comprising:
   (a) providing a memory device having a predetermined temperature profile stored therein, wherein the predetermined temperature profile continually varies temperature as a function of time and comprises a first period of temperature increase followed by a first period of temperature decrease followed by a second period of temperature increase followed by a second period of temperature decrease, wherein the predetermined temperature profile comprises a plurality of temperatures and each temperature's corresponding elapsed time from initiation of the predetermined temperature profile, and wherein the predetermined temperature profile is stored in the memory device prior to step (d) below;
   (b) placing a quantity of concrete in a thermally insulated container having a sufficient quantity of water therein so that the concrete is surrounded by the water;
   (c) repeatedly detecting the temperature of the quantity of water;
   (d) repeatedly comparing the detected temperature of the quantity of water to the temperature of the predetermined temperature profile corresponding to the time of the detected temperature; and
   (e) selectively adding heat to and removing heat from the quantity of water in the insulated container in response to step (d) so that the temperature of the quantity of water follows the predetermined temperature profile during the curing of the quantity of concrete, wherein the heat selectively added to the quantity of water comes from an electrically heated element in thermal contact with the quantity of water, wherein the heat selectively removed from the quantity of water comes from a cooling element in thermal contact with the quantity of water and wherein the selective addition of heat to the quantity of water and the removal of heat from the quantity of water is controlled by a computing device.

2. The method of curing concrete of claim 1, wherein the predetermined temperature profile covers a period of time from initiation to between 1 and 14 days.

\* \* \* \* \*